United States Patent
Ishiguro

(10) Patent No.: US 9,363,395 B2
(45) Date of Patent: Jun. 7, 2016

(54) IMAGE PROCESSING DEVICE, DISPLAY DEVICE AND NON-TRANSITORY COMPUTER READABLE RECORDING MEDIUM

(71) Applicant: Konica Minolta, Inc., Tokyo (JP)

(72) Inventor: Kazuhiro Ishiguro, Toyohashi (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 13/917,680

(22) Filed: Jun. 14, 2013

(65) Prior Publication Data
US 2013/0335765 A1    Dec. 19, 2013

(30) Foreign Application Priority Data

Jun. 18, 2012   (JP) ................................. 2012-136527

(51) Int. Cl.
*H04N 1/04*        (2006.01)
*G06F 13/00*     (2006.01)
(Continued)

(52) U.S. Cl.
CPC .......... *H04N 1/00477* (2013.01); *G06K 15/005* (2013.01); *H04N 1/0035* (2013.01); *H04N 1/00408* (2013.01); *H04N 1/00411* (2013.01);
(Continued)

(58) Field of Classification Search
CPC .......... H04N 1/00411; H04N 1/00432; H04N 1/0044; H04N 1/00442; H04N 1/00453; H04N 1/00466; H04N 1/00472; H04N 1/00474; H04N 1/00482; H04N 1/00461
See application file for complete search history.

(56) References Cited

U.S. PATENT DOCUMENTS

| | | |
|---|---|---|
| 7,002,702 B1 | 2/2006 | Machida |
| 2002/0114003 A1 | 8/2002 | Housel |

(Continued)

FOREIGN PATENT DOCUMENTS

| | | |
|---|---|---|
| CN | 101271299 A | 9/2008 |
| EP | 1 973 323 A2 | 9/2008 |

(Continued)

OTHER PUBLICATIONS

Communication Pursuant to Article 94(3) EPC dated Jan. 27, 2016 issued in the corresponding European Patent Application No. 13 172 248.0 (5 pages).

(Continued)

*Primary Examiner* — Tammy Pham
*Assistant Examiner* — Frantz Bataille
(74) *Attorney, Agent, or Firm* — Buchanan Ingersoll & Rooney PC

(57) ABSTRACT

An image processing device, comprises: a display part; a manipulation detecting part for detecting an operation; an image inputting part for inputting image data; a storage part for storing the image data; an image processing part for performing image processing in accordance with a processing process set in advance; an image outputting part for outputting an image in a predetermined way to output based on the processed image data; a display controlling part for displaying a processing path to process the image data on the display part, and for moving an icon image corresponding to the image data along the processing path; and a job controlling part for temporarily suspending the processing performed by the image processing part or the image outputting part when the manipulation detecting part detects the operation on the display part, and making change in the image processing or the way to output.

17 Claims, 22 Drawing Sheets

(51) Int. Cl.
*H04N 1/00* (2006.01)
*G06K 15/00* (2006.01)

(52) U.S. Cl.
CPC ....... *H04N 1/00413* (2013.01); *H04N 1/00506* (2013.01)

(56) References Cited

U.S. PATENT DOCUMENTS

| | | | |
|---|---|---|---|
| 2003/0151651 A1* | 8/2003 | Roztocil | G06K 15/005 347/101 |
| 2007/0216973 A1 | 9/2007 | Tagawa | |
| 2007/0220209 A1* | 9/2007 | Maeda | G06F 3/1207 711/137 |
| 2008/0186285 A1 | 8/2008 | Shimizu | |
| 2008/0193183 A1 | 8/2008 | Hiraike | |
| 2008/0231914 A1* | 9/2008 | Motoyoshi | H04N 1/00411 358/474 |
| 2012/0008176 A1* | 1/2012 | Ishida | H04N 1/0044 358/474 |
| 2012/0099129 A1 | 4/2012 | Ogino et al. | |

FOREIGN PATENT DOCUMENTS

| | | |
|---|---|---|
| JP | 2000-215322 A | 8/2000 |
| JP | 2000-315131 A | 11/2000 |
| JP | 2007-280369 A | 10/2007 |
| JP | 2008-191799 A | 8/2008 |
| JP | 2008-236539 A | 10/2008 |
| JP | 2009-230632 A | 10/2009 |
| JP | 2012-081649 A | 4/2012 |
| JP | 2012-083893 A | 4/2012 |
| JP | 2012-090111 A | 5/2012 |
| JP | 2012-095000 A | 5/2012 |
| JP | 2012-104035 A | 5/2012 |

OTHER PUBLICATIONS

Chinese First Office Action dated May 20, 2015 issued in the corresponding Chinese Patent Application No. 201310234591.4 and English translation (23 pages).

Extended European Search Report dated Aug. 30, 2013, issued by the European Patent Office in corresponding European Patent Application No. 13172248.0-1806. (7 pages).

Office Action (Decision to Grant a Patent) issued on Jul. 15, 2014, by the Japan Patent Office in corresponding Japanese Patent Application No. 2012-136527, and an English Translation of the Office Action (6 pages).

* cited by examiner

IMAGE PROCESSING DEVICE, DISPLAY DEVICE AND NON-TRANSITORY COMPUTER READABLE RECORDING MEDIUM

This application is based on the application No. 2012-136527 filed in Japan, the contents of which are hereby incorporated by reference.

BACKGROUND OF THE INVENTION

1. Field of the Invention

The present invention relates to an image processing device, a display device and a non-transitory computer readable recording medium.

2. Description of the Background Art

For executing jobs, image processing devices such as MFPs perform a series of operations. The series of operations include an operation to perform a variety of image processing set in advance to process input image data, to generate image data for output, and to output the generated image data for output. For a copy job, for instance, the image processing device performs a variety of image processing to process image data generated by reading a document by a scanner section and generates image data for drawing. The image processing device then drives a printer section to produce a printed output, thereby performing the series of operations for the copy job. The image data is output not only by being produced as the printed output. For a scan job, for instance, the image data is sent to another device over a network, or is stored in a storage region called as box (BOX) in a hard disk device installed on the image processing device.

This type of conventional image processing devices are capable of editing the image data generated by executing the jobs after execution of the jobs. This known technique is introduced for example in Japanese Patent Application Laid-Open No. JP 2009-230632 A (hereafter, document 1) and Japanese Patent Application Laid-Open No. JP 2008-236539 A (hereafter, document 2).

It is assumed that there is a document including multiple pages, each of which having images printed on both sides, and a scan job for each side of the page of the document is executed. According to the known technique disclosed in document 1, after two scan jobs per one side page are executed, a group of odd pages and a group of even pages generated in response to two scan jobs are rearranged with simple operation. As a result, a document file containing the image data of the first page to the last page in order of front to back is allowed to be created.

According to the known technique disclosed in document 2, a list of images generated by a scan job is displayed on an operational panel which is operable by a user by touching its screen after execution of the scan job, and an edit icon is displayed next to the list. When the user drags the image of the list on the edit icon, an edit processing corresponding to the edit icon to process the image selected by the user is started.

According to the known techniques disclosed in the respective documents 1 and 2, image data as intended by a user is processed or edited in response to edit operation by the user after execution of the scan job.

Users sometimes notice that settings for image processing or settings for a way to output are configured not as intended after he or she gives an instruction on job execution to the image processing device to the time at which the job is complete. It is assumed, for example, the user would like to have copied outputs in full color by making the image processing device read a colored document including multiple pages. By checking the first page actually output by the image processing device, the user notices that color settings for image processing is configured not as intended before the whole pages are produced as printed outputs if the first page is printed in black and white. Even before the processing to produce the printed output of the first page is started, the user may notice that he or she forgot to change the color settings to full color from black and white soon after he or she gives an instruction to execute the job or before giving the instruction.

In such cases, according to the above-described known techniques, the series of operations performed during execution of the job are not allowed to be changed in the middle of the process. For the conventional image processing devices, the user cancels to terminate the job in the middle of the execution. The user then configures again the settings for image processing or the settings for the way to output as intended. After that, the user is necessary to give the instruction on execution of the job again. When canceling the execution of the job in the middle of the process, reading operation for almost all pages of the document including multiple pages may be completed at the time at which the user gives the instruction to cancel the job. In this case, the image data already generated by reading the document would be wasted. Also for the user, he or she has to place again the document already read once on the scanner section when again giving the instruction on the execution of the job, resulting in poor operation efficiency.

It's very much a situation in which the user notices that the settings for image processing or the setting for the way to output for executing the job are configured not as intended after the job is complete on the image processing device. Also in this case, the user configures again the settings for image processing or the settings for the way to output as intended. After that, the user is necessary to give the instruction on execution of the job again. It is supposed that the reason why the user cannot notice a mistake on the settings before the job is executed is that the conventional image processing devices are not capable of allowing the user to see what processing on the image data is performed during the execution of the job and haw far the processing is carried out on a real-time basis. The conventional image processing devices are not capable of showing the details of the series of the operations performed during the execution of the job to the user on the real-time basis. Therefore, the user often notices that the settings for image processing or the settings for the way to output are not configured as intended by checking the output image after the execution of the job is complete. The execution of the job would be wasted.

SUMMARY OF THE INVENTION

The present invention is intended to solve the above problems. Thus, the present invention is intended to provide an image processing device, a display device and a non-transitory computer readable recording medium capable of allowing a user to check a series of operations performed during execution of a job and allowing a process detail or a process order of image data included in the series of operations to be changed in response to user's operation even in the middle of the execution of the job.

First, the present invention is directed to an image processing device.

According to an aspect of the image processing device, the image processing device, comprises: a display part on which a variety of information is displayed; a manipulation detecting part for detecting an operation on the display part; an image inputting part for inputting image data; a storage part for storing the image data input by the image inputting part; an image processing part for reading the image data stored in the storage part and performing image processing in accordance with a processing process set in advance; an image outputting part for outputting an image in a predetermined way to output based on the image data which is processed by the image processing part; a display controlling part for displaying a processing path to process the image data from the processing after the image data is input by the image inputting part to the processing until the image is output by the image outputting part on the display part, and for moving an icon image corresponding to the image data along the processing path; and a job controlling part for temporarily suspending the processing performed by the image processing part or the image outputting part when the manipulation detecting part detects the operation on the display part with the icon image corresponding to the image data being displayed in the processing path by the display controlling part, and making change in the image processing performed by the image processing part or the way for the image outputting part to output based on the operation detected by the manipulation detecting part.

Second, the present invention is directed to a display device capable of displaying in cooperation with an image processing device capable of performing a variety of image processing to process image data.

According to an aspect of the display device, the image processing device includes: an image inputting part for inputting the image data; a storage part for storing the image data input by the image inputting part; an image processing part for reading the image data stored in the storage part and performing the image processing in accordance with a processing process set in advance; an image outputting part for outputting an image in a predetermined way to output based on the image data which is processed by the image processing part; and a job controlling part for controlling the image processing performed by the image processing part or the processing to output the image performed by the image outputting part. The display device includes: a communication part for establishing communication with the job controlling part of the image processing device; a display part on which a variety of information is displayed; a manipulation detecting part for detecting an operation on the display part; and a display controlling part for displaying a processing path to process the image data from the processing after the image data is input by the image inputting part to the processing until the image is output by the image outputting part on the display part, and for moving an icon image corresponding to the image data along the processing path. The manipulation detecting part sends a stop signal to temporarily suspend the processing performed by the image processing part or the image outputting part to the job controlling part via the communication part and sends instruction information to make change in the image processing performed by the image processing part or a way for the image outputting part to output based on the operation detected by the manipulation detecting part to the job controlling part when the manipulation detecting part detects the operation on the display part with the icon image moved along the processing path being displayed by the display controlling part.

Third, the present invention is directed to a non-transitory computer readable recording medium on which a program is recorded. The program is executable on a display device including a display part on which a variety of information is displayed and capable of detecting an operation on the display part. The program is executed on the display device, thereby causing the display device to display in cooperation with an image processing device capable of performing a variety of image processing to process image data.

According to an aspect of the non-transitory computer readable recording medium, the image processing device includes: an image inputting part for inputting the image data; a storage part for storing the image data input by the image inputting part; an image processing part for reading the image data stored in the storage part and performing the image processing in accordance with a processing process set in advance; an image outputting part for outputting an image in a predetermined way to output based on the image data which is processed by the image processing part; and a job controlling part for controlling the image processing performed by the image processing part or the processing to output the image performed by the image outputting part. The program executed on the display device to function as a system comprises: a communication part for establishing communication with the job controlling part of the image processing device; a manipulation detecting part for detecting an operation on the display part; and a display controlling part for displaying a processing path to process the image data from the processing after the image data is input by the image inputting part to the processing until the image is output by the image outputting part on the display part, and for moving an icon image corresponding to the image data along the processing path. The manipulation detecting part sends a stop signal to temporarily suspend the processing performed by the image processing part or the image outputting part to the job controlling part via the communication part and sends instruction information to make change in the image processing performed by the image processing part or a way for the image outputting part to output based on the operation detected by the manipulation detecting part to the job controlling part when the manipulation detecting part detects the operation on the display part with the icon image moved along the processing path being displayed by the display controlling part.

DESCRIPTION OF THE PRESENT PREFERRED EMBODIMENTS

Figure 1:
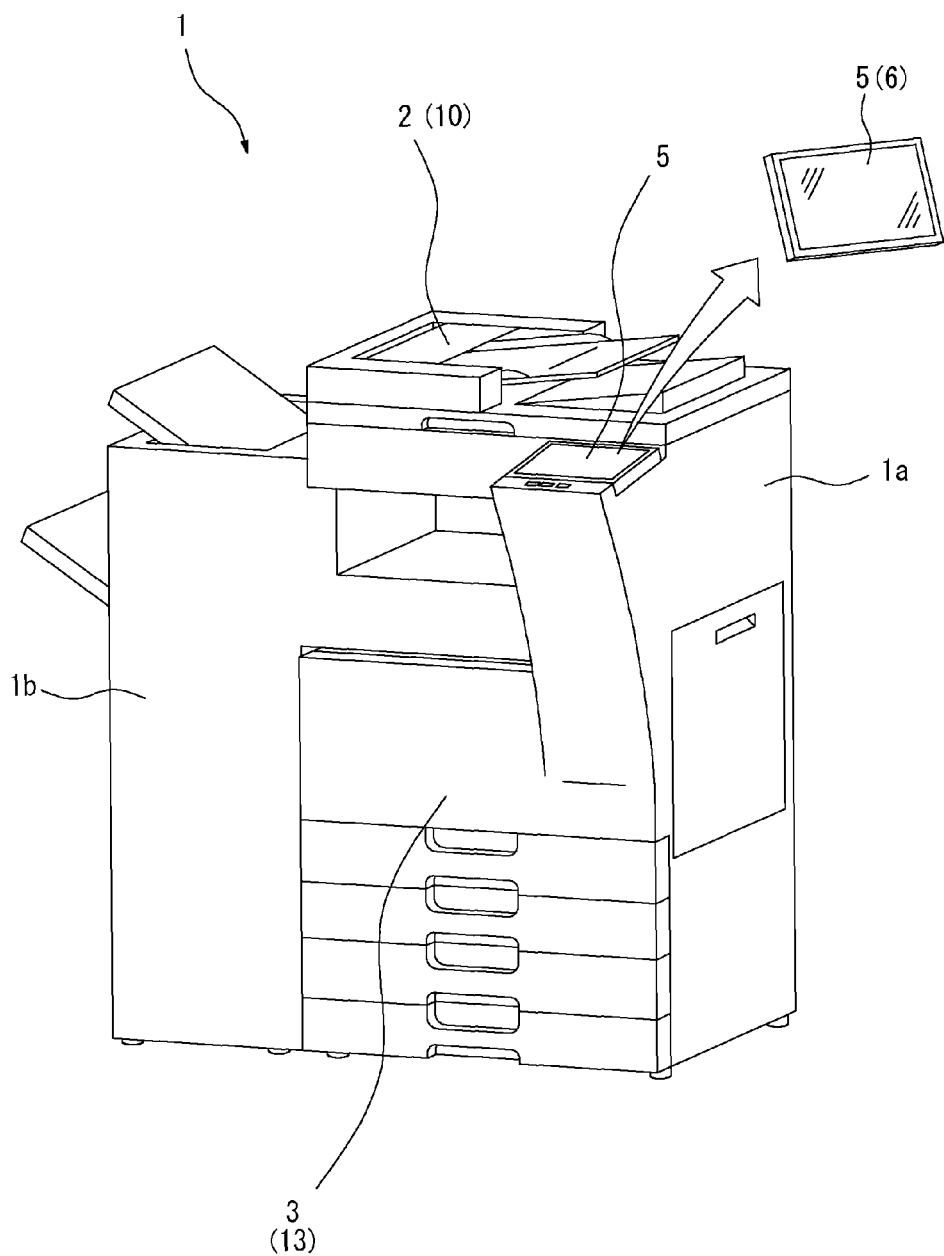
FIG. 1 shows an exemplary configuration of an image processing device.

Preferred embodiment of the present invention is described in detail below with reference to figures. In the description given below, those elements which are shared in common among figures are represented by the same reference numerals, and these elements are not discussed repeatedly for the same description.

FIG. 1 shows an exemplary configuration of an image processing device 1 of the present preferred embodiment. The image processing device 1 is formed from a device such as one of MFPs (Multi-functional peripherals) capable of executing a variety of jobs including copy jobs, print jobs, scan jobs and fax jobs. The image processing device 1 is provided with a post-processing device 1b on its device body 1a.

The device body 1a of the image processing device 1 includes a scanner section 2 and a printer section 3. The scanner section 2 is driven to read a document and generate image data thereof. The printer section 3 is driven to produce a printed output by forming an image on a sheet such as a printing sheet. The device body 1a is provided with an operational panel 5, a user interface operable by a user in use of the image processing device 1, on its front side. The operational panel 5 can be attached and removed from the device body 1a. For using the operational panel 5 by removing from the device body 1a, the operational panel 5 serves as a portable display device 6 such as a tablet terminal. The operational panel 5 establishes wired or radio communication with the device body 1a, thereby displaying a variety of operation screen images and notifying the device body 1a of an operation by the user after detecting the operation.

The post-processing device 1b is brought into operation when a printed output is produced on the image processing device 1. The post-processing device 1b performs finishing including folding and stapling on a printed sheet output from the device body 1a.

Figure 2:
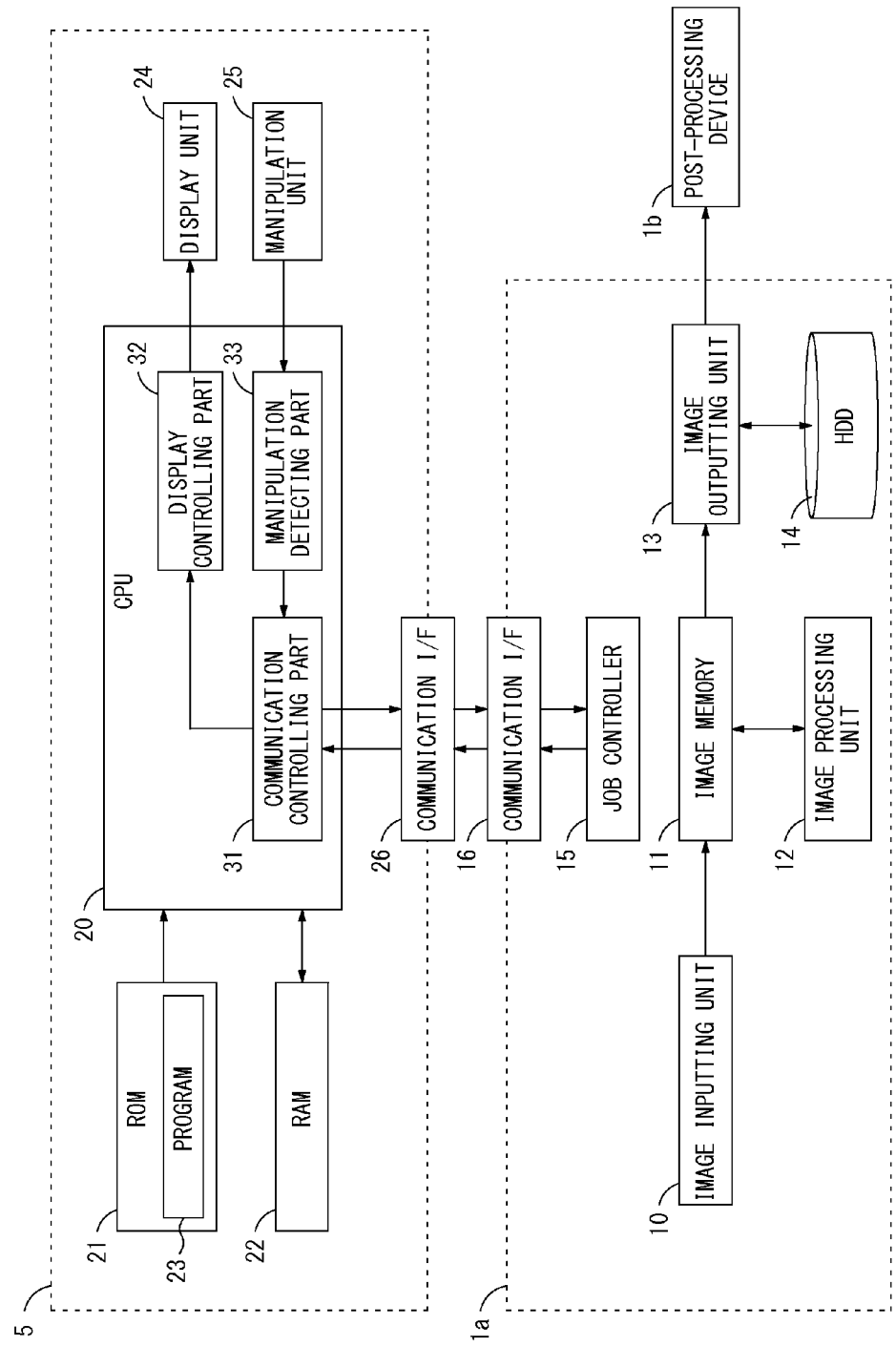
FIG. 2 is a block diagram showing an exemplary hardware configuration of the image processing device.

FIG. 2 is a block diagram showing an exemplary hardware configuration of the image processing device 1. As illustrated in FIG. 2, the device body 1a of the image processing device 1 includes an image inputting unit 10, an image memory 11, an image processing unit 12, an image outputting unit 13, a hard disk device 14, a job controller 15 and a communication interface 16. Each unit is brought into operation on the device body 1a so that the image processing device 1 is allowed to execute various types of jobs including copy jobs, print jobs, scan jobs and fax jobs. In response to receiving image data to be a target of execution of the job over a network, for example, the image processing device 1 executes the print job. When the user places a document on the scanner section 2 and gives an instruction on execution of a job by using the operational panel 5, the image processing device 1 executes the job such as the copy job, the scan job or the fax transmission job specified by the user.

Figure 3:
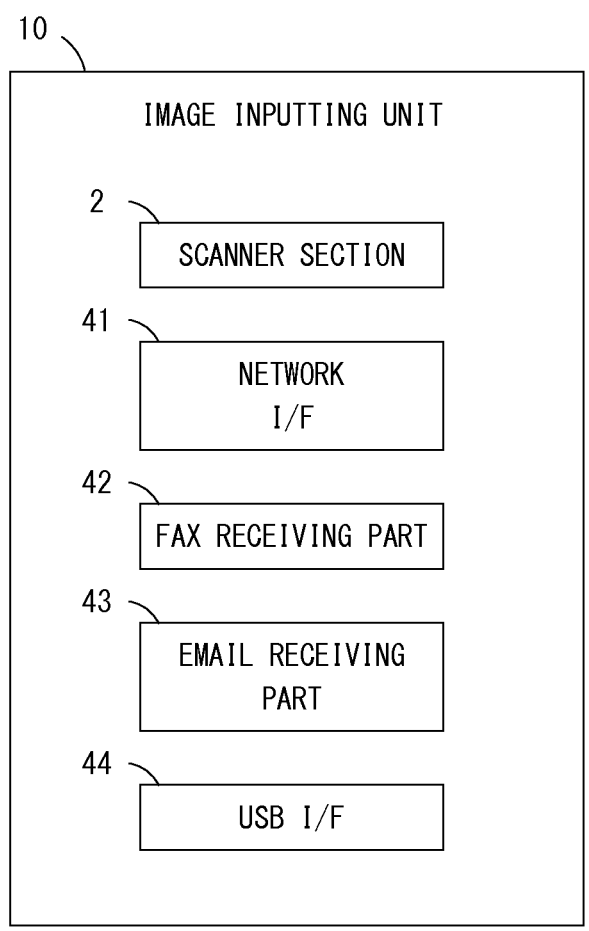
FIG. 3 is a block diagram showing an exemplary configuration included in an image inputting unit.

The image inputting unit 10 inputs image data to be a target of execution of the job. The image inputting unit 10 includes the aforementioned scanner section 2. The image inputting unit 10 also includes a variety of structures that are capable of inputting the image data besides the scanner section 2. FIG. 3 is a block diagram showing an exemplary configuration of the image inputting unit 10. As illustrated in FIG. 3, the image inputting unit 10 includes the scanner section 2, a network interface 41, a fax receiving part 42, an email receiving part 43 and a USB interface 44. The scanner section 2 is brought into operation for executing the job, such as the copy job, the scan job or the fax transmission job, for instance, to generate the image data to be the target of execution of the job by reading the document as described above. The network interface 41 inputs the image data to be the target of execution of the print job, for instance, over the network such as LAN (Local Area Network). The fax receiving part 42 receives fax data over lines such as public phone lines, thereby obtaining the image data to output. The email receiving part 43 periodically accesses an email server connected to the network, and obtains an email as the image data to output if any email addressed to the image processing device 1 is saved in the email server. The USB interface 44 is an interface to which an external storage device such as a USB memory is connected. The USB interface 44 obtains the image data stored in the external storage device as the target of execution of the job. The image inputting unit 10 is also capable of obtaining the image data stored in the hard disk device 14, for example, as the target of execution of the job. In response to obtaining the image data to be the target of execution of the job after starting execution of the job, the image inputting unit 10 having the configuration of FIG. 3 stores the obtained image data in the image memory 11. The image data obtained by the image inputting unit 10 as the target of execution of the job may be the image data of single page or the image data of multiple pages.

Figure 4:
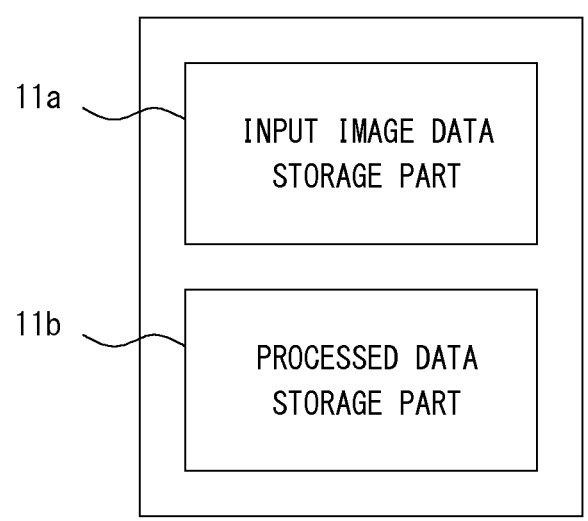
FIG. 4 is a block diagram showing an exemplary configuration of an image memory.

The image memory 11 includes a storage region in which the image data of multiple pages may be stored. FIG. 4 is a block diagram showing an exemplary configuration of the image memory 11. As shown in FIG. 4, the image memory 11 includes an input image data storage part 11a and a processed data storage part 11b. The image data obtained by the image inputting unit 10 is stored in the input image data storage part 11a. The image data stored in the input image data storage part 11a remains original data (initial data) until execution of the job is complete without being updated.

The image processing unit 12 sequentially reads the image data of single page stored in the input image data storage part 11a of the image memory 11 and performs the image processing in accordance with a predetermined processing process. The image processing unit 12 is capable of sequentially performing multiple image processing in accordance with the predetermined processing process.

Figure 5:
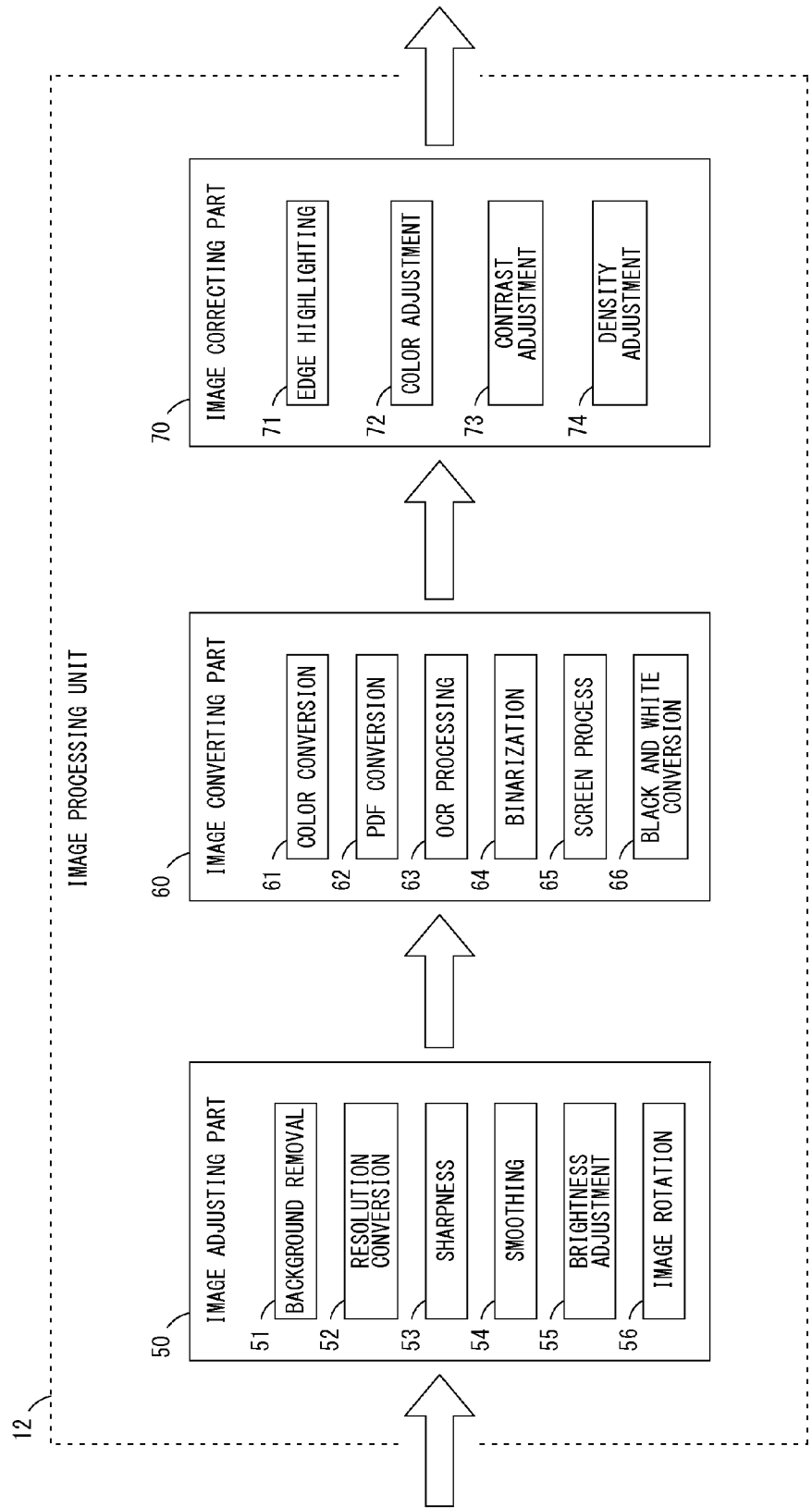
FIG. 5 is a block diagram showing an exemplary detailed configuration included in an image processing unit.

FIG. 5 is a block diagram showing an exemplary detailed configuration of the image processing unit 12. The image processing unit 12 includes an image adjusting part 50, an image converting part 60 and an image correcting part 70. The image processing unit 12 brings each part sequentially, thereby processing the image data one by one.

The plurality of image processing performed by the image adjusting part 50 include a background removal 51, a resolution conversion 52, a sharpness 53, a smoothing 54, a brightness adjustment 55 and an image rotation 56. The image adjusting part 50 does not always perform all of the plurality of image processing 51 to 56 for every execution of the job. More specifically, the image adjusting part 50 selects the processing of the plurality of processing 51 to 56 set in advance by the user based on the job type or in response to the user's instruction and performs the selected processing.

The plurality of image processing performed by the image converting part 60 include a color conversion 61, a PDF (Portable Document Format) conversion 62, an OCR (Optical Character Reader) processing 63, a binarization 64, a screen process 65 and black and white conversion 66. The image converting part 60 does not always perform all of the plurality of image processing 61 to 66 for every execution of the job. More specifically, the image converting part 60 selects the processing of the plurality of processing 61 to 66 set in advance by the user based on the job type or in response to the user's instruction and performs the selected processing as well as the image adjusting part 50.

The plurality of image processing performed by the image correcting part 70 include an edge highlighting 71, a color adjustment 72, a contrast adjustment 73 and a density adjustment 74. The image correcting part 70 does not always perform all of the plurality of processing 71 to 74 for every execution of the job. More specifically, the image correcting part 70 selects the processing of the plurality of processing 71 to 74 set in advance by the user based on the job type or in response to the user's instruction and performs the selected processing as well as the image adjusting part 50 and the image converting part 60.

The image processing unit 12 sequentially performs the image processing in accordance with the processing process set in advance by each of the image adjusting part 50, the image converting part 60 and the image correcting part 70, thereby generating the image data suitable for the image output. The image processing unit 12 reads the original image data in the input image data storage part 11a of the image memory 11 to perform the image processing. The processed image data generated by the first image processing is stored in the processed data storage part 11b of the image memory 11. The image processing unit 12 then reads the image data already processed with the previous image processing in the processed data storage part 11b of the image memory 11 to sequentially perform the following image processing. The image processing unit 12 sequentially updates the image data stored in the processed data storage part 11b. The image data obtained by the image inputting unit 10 remaining the original data is stored in the input image data storage part 11a, and the image data sequentially updated in response to progress of the image processing is stored in the processed data storage part 11b. After the job is executed normally, the job controller 15 automatically deletes the image data stored in the input image data storage part 11a and the processed data storage part 11b of the image memory 11.

The image processing unit 12 may perform each of the plurality of image processing as described above on a hardware separately installed or on a software.

For performing each aforementioned processing on the hardware separately installed, for example, the image processing unit 12 is allowed to activate each hardware all at once. The image processing unit 12, therefore, may perform the plurality of image processing as described above all at once, and carry out the image processing on the image data of the multiple pages in parallel. The high-speed processing can be realized on the hardware. All of the image processing in accordance with the predetermined processing process may be complete in few microseconds.

For performing each processing on the software, all functions of a CPU are used for the processing to process the image data of single page. The image processing unit 12, therefore, is not allowed to carry out the processing on the image data of the multiple pages in parallel like the hardware. If each of the image adjusting part 50, the image converting part 60 and the image correcting part 70 includes the different CPU, the image processing performed by the respective image adjusting part 50, the image converting part 60 and the image correcting part 70 may be carried out in parallel. Compared to the hardware, it is much slower to carry out the image processing on the software.

After the image processing in accordance with the predetermined processing process is performed by the image processing unit 12, the image outputting unit 13 is brought into operation next. The image outputting unit 13 reads the image data processed through the entire necessary image processing by the image processing unit 12 in the processed data storage part 11b and outputs the image in a predetermined way to output.

Figure 6:
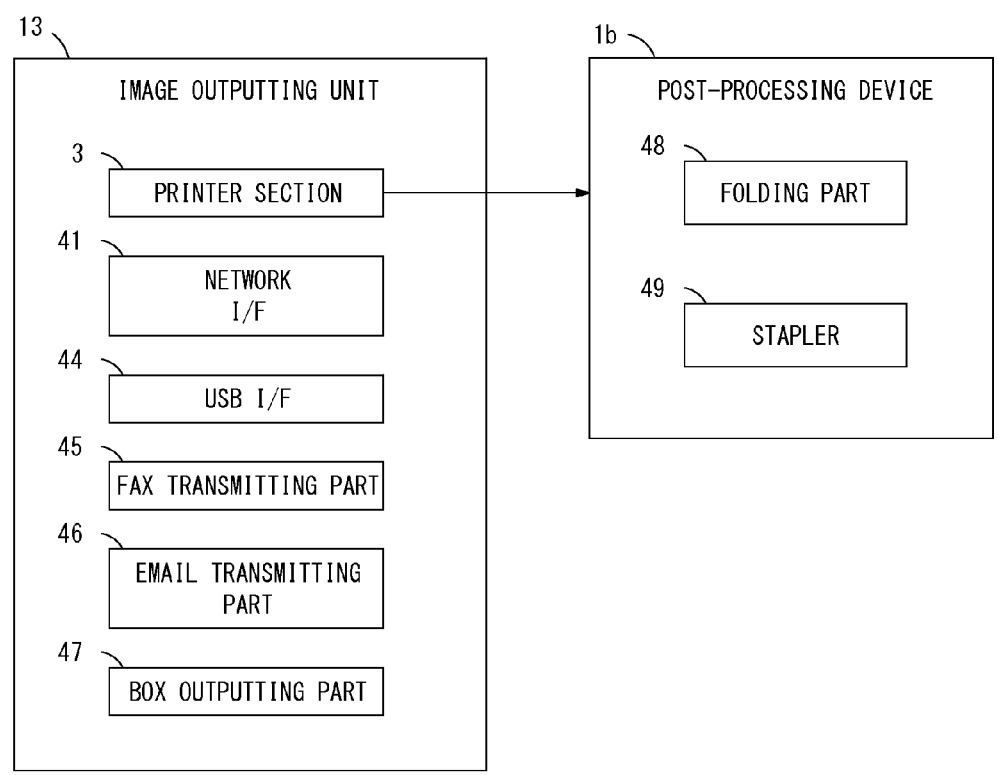
FIG. 6 is a block diagram showing an exemplary configuration included in an image outputting unit.

The image outputting unit 13 includes the aforementioned printer section 3. The image outputting unit 13 also includes a variety of structures that are capable of outputting the image besides the printer section 3. FIG. 6 is a block diagram showing an exemplary configuration of the image outputting unit 13. As illustrated in FIG. 6, the image outputting unit 13 includes the printer section 3, the network interface 41, the USB interface 44, a fax transmitting part 45, an email transmitting part 46 and a box outputting part 47. The printer section 3 is brought into operation for executing the job such as the copy job or the print job, for instance to produce a printed output by forming an image on the printed sheet based on the image data stored in the processed data storage part 11b of the image memory 11. For executing the scan job, for instance, the network interface 41 sends the image data stored in the processed data storage part 11b of the image memory 11 to another computer over the network. The USB interface 44 outputs the image data stored in the processed data storage part 11b of the image memory 11 to the external storage device such as a USB memory to store. The fax transmitting part 45 generates fax data with the image data stored in the processed data storage part 11b of the image memory 11 and sends the generated fax data to an external address over the lines such as the public phone lines. The email transmitting part 46 creates an email containing the image data stored in the processed data storage part 11b of the image memory 11 as an attachment file and sends the email to an external email server over the network. For executing the scan job, for instance, the box outputting part 47 outputs the image data stored in the processed data storage part 11*b* of the image memory 11 to the storage region (BOX) in the hard disk device 14 to store.

As described above, the image outputting unit 13 includes the plurality of processing parts each of which is capable of outputting the image in a different way. The image outputting unit 13 outputs the image in a way set in advance by the user based on the job type or in response to the user's instruction.

As illustrated in FIG. 6, the post-processing device 1*b* is connected to the printer section 3. When the printed output is produced by the printer section 3 of the image processing device 1, the printed output produced by the printer section 3 is fed to the post-processing device 1*b*. The post-processing device 1*b* includes a folding part 48 and a stapler 49 as shown in FIG. 6. The post-processing device 1*b* folds the printed output or staples the printed output based on the finishing settings configured in advance by the user before the instruction on execution of the job is given. The post-processing device 1*b* may perform finishing processing besides folding or stapling.

Referring back to FIG. 2, the job controller 15 controls each operation on the aforementioned image inputting unit 10, the image processing unit 12, the image outputting unit 13 and the post-processing device 1*b*, thereby controlling overall process of execution of the job on the image processing device 1. In response to starting execution of the job, the job controller 15 gives an instruction on the image processing that should be performed to the image processing unit 12 based on the job type or the settings configured in advance by the user. The job controller 15 also gives an instruction on the way how the image is output to the image outputting unit 13 and the post-processing device 1*b*. After starting execution of the job, the job controller 15 causes the image inputting unit 10, the image processing unit 12, the image outputting unit 13 and the post-processing device 1*b* to perform the necessary operations, respectively, thereby controlling a series of the operations performed for execution of the job.

The job controller 15 establishes communication with the operational panel 5 via the communication interface 16. The communication interface 16 establishes wired or radio communication. In response to starting execution of the job, the job controller 15 sends process detail of the processing performed by each of the image inputting unit 10, the image processing unit 12, the image outputting unit 13 and the post-processing device 1*b* to the operational panel 5 via the communication interface 16. By obtaining operation information from the operational panel 5 from the time at which execution of the job is started to the time at which execution of the job is complete, the job controller 15 performs the processing in accordance with the operation information. More specifically, the job controller 15 temporarily suspends the job execution operation, changes the image processing performed during execution of the job or changes the way to output the image in accordance with the operation information received from the operational panel 5.

As illustrated in FIG. 2, the operational panel 5 includes a CPU 20, a ROM 21, a RAM 22, a display unit 24, a manipulation unit 25 and a communication interface 26. The CPU 20 is a computation unit that reads and executes a program 23 stored in advance in the ROM 21. The ROM 21 is formed from a nonvolatile memory, in which a variety of data besides the above-described program 23 is stored in advance. The RAM 22 stores therein data such as temporary data required in accordance with execution of the program 23 by the CPU 20. The display unit 24 on which various types of information is displayed to the user is formed from a device such as a color liquid crystal display, for example. The manipulation unit 25 receives entries of a variety of instructions by the user. The manipulation unit 25 is formed with parts such as touch panel sensors arranged on the screen of the display unit 24, for example. The communication interface 26 is an interface to establish wired or radio communication with the device body 1*a*.

With execution of the program 23, the CPU 20 of the operational panel 5 serves as a communication controlling part 31, a display controlling part 32, a manipulation detecting part 33. The communication controlling part 31 outputs information received from the device body 1*a* via the communication interface 26 to the display controlling part 32, or outputs the operation information received from the manipulation detecting part 33 to the communication interface 26 to send the information to the device body 1*a*.

The display controlling part 32 controls a screen image displayed on a viewing area of the display unit 24. The display controlling part 32 of the present preferred embodiment especially specifies the process detail of the processing that is performed by each of the image inputting unit 10, the image processing unit 12, the image outputting unit 13 and the post-processing device 1*b* based on the information received from the job controller 15 when the job is executed on the image processing device 1. The display controlling part 32 displays a processing path to process the image data from the processing after the image inputting unit 10 inputs the image data to the processing until the image output by the image outputting unit 13 or the post-processing device 1*b* is completed on the display unit 24. The display controlling part 32 also controls to move an icon image corresponding to the image data along the processing path.

The speed of moving the icon image along the processing path does not necessarily correspond to the process speed on the image processing unit 12. As already described above, when the image processing unit 12 is formed from the hardware, for example, all the image processing carried out on the image processing unit 12 only takes few microseconds to complete. If the icon image is moved with the same speed as the process speed on the image processing unit 12, the icon image is not visible and the user cannot recognize the process of moving the icon image. The speed of moving the icon image along the processing path is preferably set slower than the process speed of the image processing actually performed on the image processing unit 12.

The manipulation detecting part 33 detects an operation when the user makes the operation on the manipulation unit 25. The manipulation detecting part 33 detects the user's operation as the icon image moving in the processing path is displayed on the viewing area of the display unit 24 by the display controlling part 32. The manipulation detecting part 33 then outputs the operation information based on the detected operation to the communication controlling part 31 and the display controlling part 32. After inputting the operation information from the manipulation detecting part 33, the display controlling part 32 updates the screen image displayed on the display unit 24 in accordance with the input operation information. In response to inputting the operation information from the manipulation detecting part 33, the communication controlling part 31 sends the operation information to the job controller 15. Especially the operation information sent to the job controller 15 from the manipulation detecting part 33 contains information including a stop signal to temporarily suspend execution of the job, instruction information specifying to change the image processing or the way to output performed during execution of the job or a restart signal to cancel the temporal suspension and restart execution of the job.

The screen images displayed on the viewing area of the operational panel 5 when the job is executed on the image processing device 1 with the above-described processing parts are shown, and the operation that may be made by the user in the middle of execution of the job and the processing performed by the image processing device 1 in response to the user's operation are explained in detail next.

Figure 7:
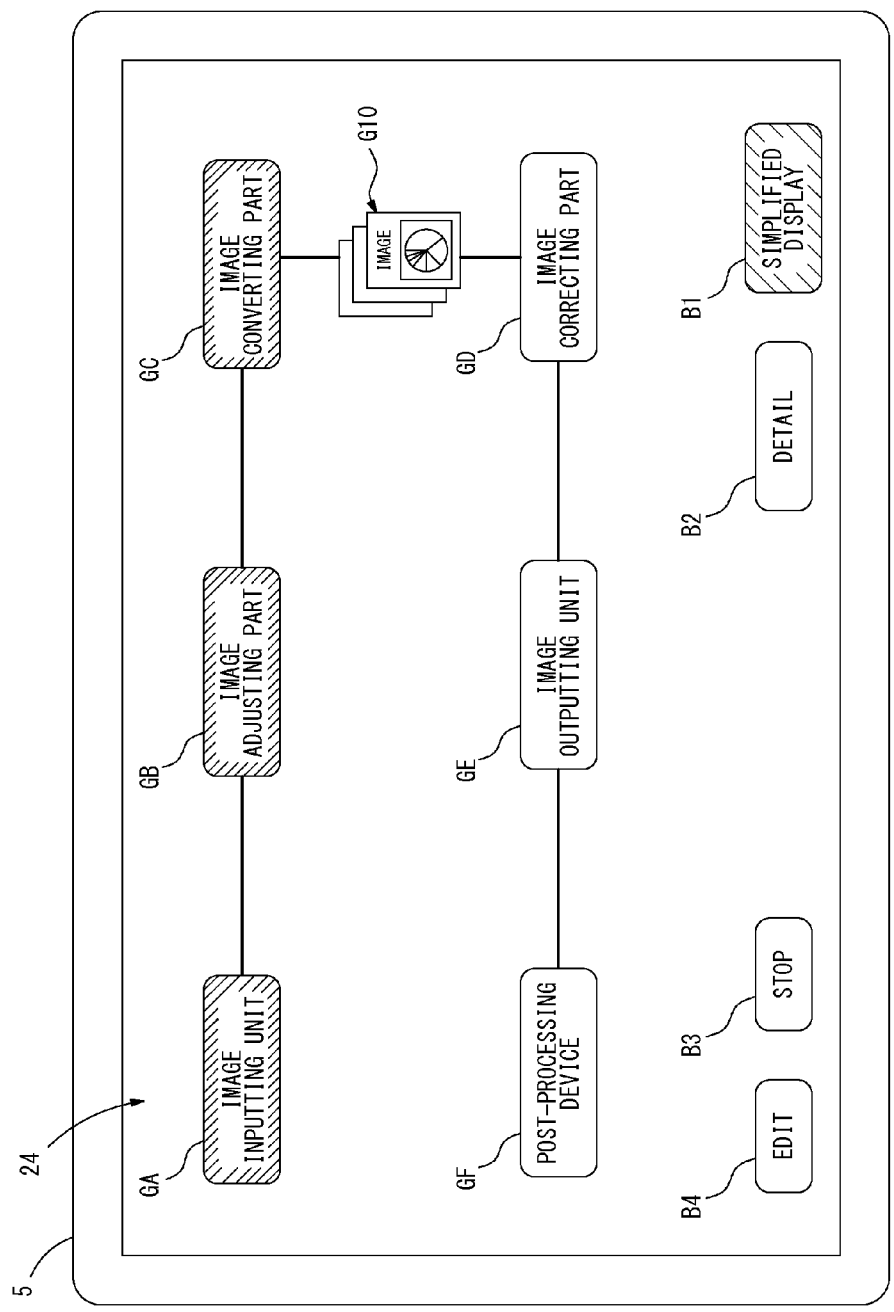
FIG. 7 is an example of a screen image displayed on a viewing area of an operational panel until the image processing device completes execution of a job after starting it.

FIGS. 7 to 19 are an example of the screen image displayed on the viewing area of the operational panel 5 from starting execution of the job until when execution is completed on the image processing device 1. In response to starting execution of the job, the image processing device 1 of the present preferred embodiment displays the processing path through which the image data goes from the time at which the image data, the target of execution of the job, is input to the image inputting unit 10 until when the image is output at least by the image outputting unit 13. FIG. 7 is an example of the screen image simply showing the processing path to process the image data displayed on the viewing area of the operational panel 5. The processing path to process the image data displayed on the viewing area of the display unit 24 of the operational panel 5 includes a process block GA corresponding to the image inputting unit 10, a process block GB corresponding to the image adjusting part 50 of the image processing unit 12, a process block GC corresponding to the image converting part 60 of the image processing unit 12, a process block GD corresponding to the image correcting part 70 of the image processing unit 12, a process block GE corresponding to the image outputting unit 13 and a process block GF corresponding to the post-processing device 1b. Those process blocks GA to GF are connected with a path line in accordance with a process order and shown on the viewing area. In the screen image example of FIG. 7, the processing is performed in alphabetical order of the process blocks GA, GB, GC, GD, GE and GF.

Inside each of the process blocks GA, GB, GC, GD, GE and GF shown in the processing path, image processing information specifying the process detail of the processing to process the image data is displayed in a text format, for example. The user, therefore, is allowed to easily recognize what processing is performed in each process block GA, GB, GC, GD, GE and GF.

An icon image G10 corresponds to the image data, the target of the processing is shown in the processing path displayed as described above on the viewing area of the display unit 24 of the operational panel 5. The icon image G10 of FIG. 7 is shown for each job. More specifically, when the image data of the multiple pages is processed sequentially in response to execution of the job, for example, the image corresponds to the image data of the first page is shown as the icon image G10. The icon image G10 thereby shown may be a thumbnail image created from the image data of the actual first page stored in the image memory 11, or a sample image stored in advance in the storage part such as the ROM 21. For displaying the thumbnail image as the icon image G10, the display controlling part 32 may obtain the thumbnail image created by the image processing unit 12, for example. Alternatively, the display controlling part 32 may obtain the image data of the actual first page from the device body 1a and create the thumbnail image.

The display controlling part 32 moves the icon image G10 as shown in FIG. 7 in the processing path as the processing on the image data of the first page is carried out on the device body 1a. The display controlling part 32, for example, specifies the process detail of the processing performed by each of the image processing unit 12, the image outputting unit 13 and the post-processing device 1b with the information received from the job controller 15. After specifying the process detail, the display controlling part 32 calculates the process time required for each processing based on information including data size of the image data to be the target of the processing. The display controlling part 32 then sets in advance the speed of moving the icon image with the calculated value of the process time. When the image processing unit 12 is formed from the hardware, each processing is completed in a really short time. In such a case, the display controlling part 32 sets the speed of moving the icon image to be faster than a fixed speed. When the image processing unit 12 formed from the software performs the image processing, the process time required for each processing may be set as the speed of moving the icon image. Alternatively, if the process time is shorter than a predetermined period of time, the display controlling part 32 may set the speed of moving the icon image to be faster than the fixed speed as well as for the image processing unit 12 formed from the hardware. As the image processing unit 12 of the device body 1a starts the processing, the display controlling part 32 starts moving the icon image G10 sequentially along the processing path based on the moving time set in advance.

In the example of FIG. 7, the image processing from the first to the processing shown as the process block GC corresponding to the image converting part 60 has been carried out to process the image data of the first page, and it shows to be a state before moving on to the process block GD corresponding to the image correcting part 70. The process blocks GA, GB and GC that have been processed are preferably shown differently from the unprocessed process blocks GD, GE and GF. As a result, the user is allowed to easily recognize how far the process is carried out from start to completion of execution of the job on the image processing device 1.

Figure 8:
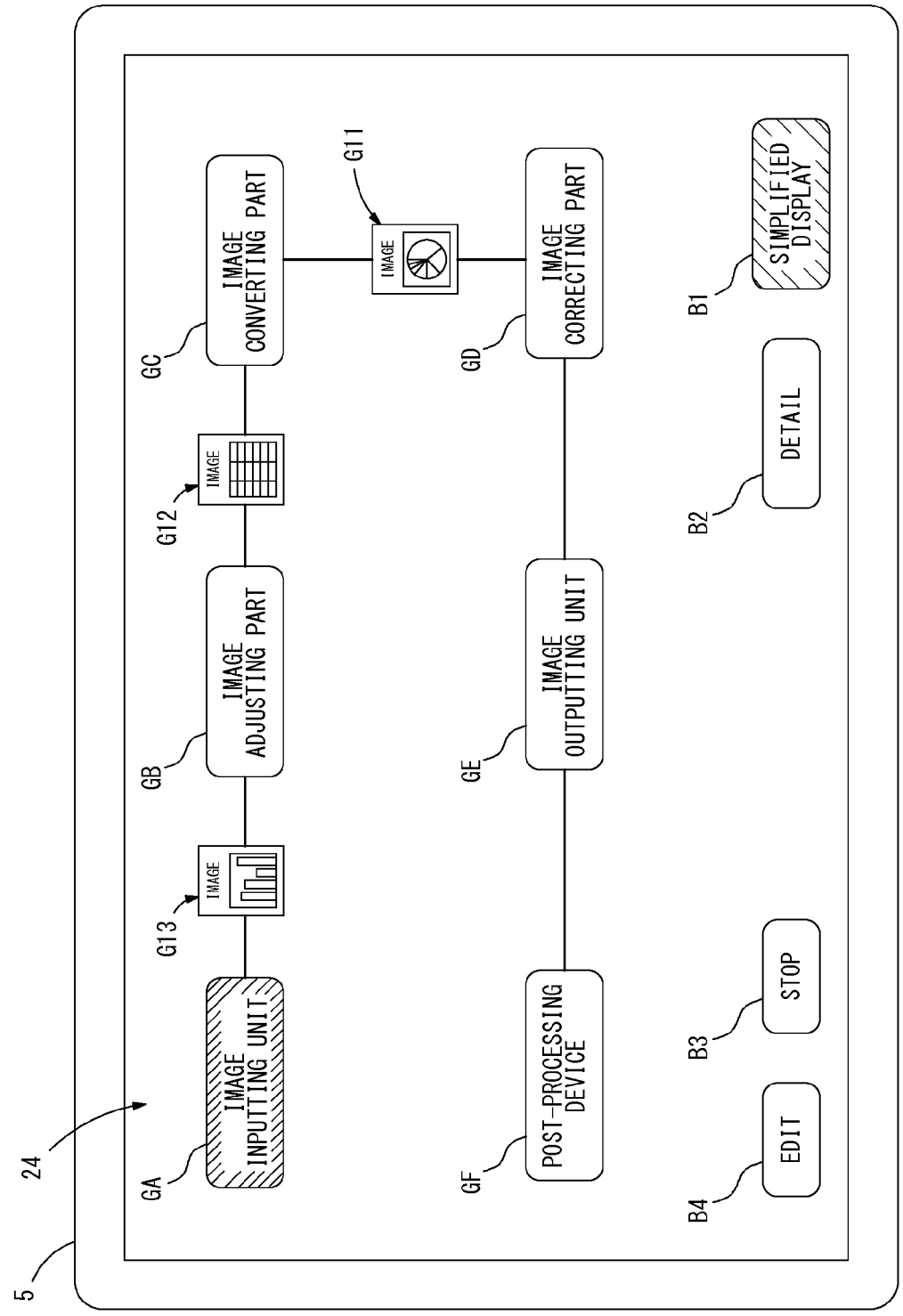
FIG. 8 is an example of a screen image displayed on the viewing area of the operational panel until the image processing device completes execution of the job after starting it.

Although the icon image G10 is shown for each job, the icon image may be shown for each page. FIG. 8 is an example of the screen image simply showing the processing path to process the image data displayed on the viewing area of the operational panel 5 with showing icon images G11, G12 and G13 for each page. When the image data of the multiple pages is processed sequentially in response to execution of the job, for example, the multiple icon images G11, G12 and G13 each of which corresponds to the respective pages may be shown in the processing path. The icon images G11, G12 and G13 thereby shown may be the thumbnail images created from the image data of the corresponding page stored in the image memory 11 as described above, or the sample images stored in advance in the storage part such as the ROM 21.

The display controlling part 32 moves each of the multiple icon images G11, G12 and G13 as shown in FIG. 8 in the processing path as the processing on the image data of the corresponding page is carried out on the device body 1a. The process block GA the processing corresponding to which has been processed for all pages is preferably shown differently from other process blocks GB, GC, GD, GE and GF. As a result, the user is allowed to easily recognize how far the process is carried out from start to completion of execution of the job on the image processing device 1.

The icon image to be shown on the screen image may be either the icon image G10 for each job as shown in FIG. 7 or the icon images G11, G12 and G13 for each page as shown in FIG. 8, and it is optional. So, either way may be configured in advance as default settings with the operational panel 5, for example, and the icon image may be shown in accordance with the default settings. Alternatively, the way to show the icon image may be switched in response to user's operation.

As shown in FIGS. 7 and 8, a simplified display key B1, a detail key B2, a stop key B3 and an edit key B4 are shown at the bottom of the screen image. The user is allowed to operate these keys B1 to B4 by tapping. In the examples of FIGS. 7 and 8, the screen image is simply showing the processing path. So, the simplified display key B1 of FIGS. 7 and 8 is being selected. If the user taps the detail key B2, the screen image is switched to show the processing path in detail. In response to detecting that the detail key B2 is tapped by the user, the manipulation detecting part 33 outputs the operation information corresponds to the user's operation to the display controlling part 32. The display controlling part 32 then switches the screen image simply showing the processing path to the one showing the processing path in detail.

Figure 9:
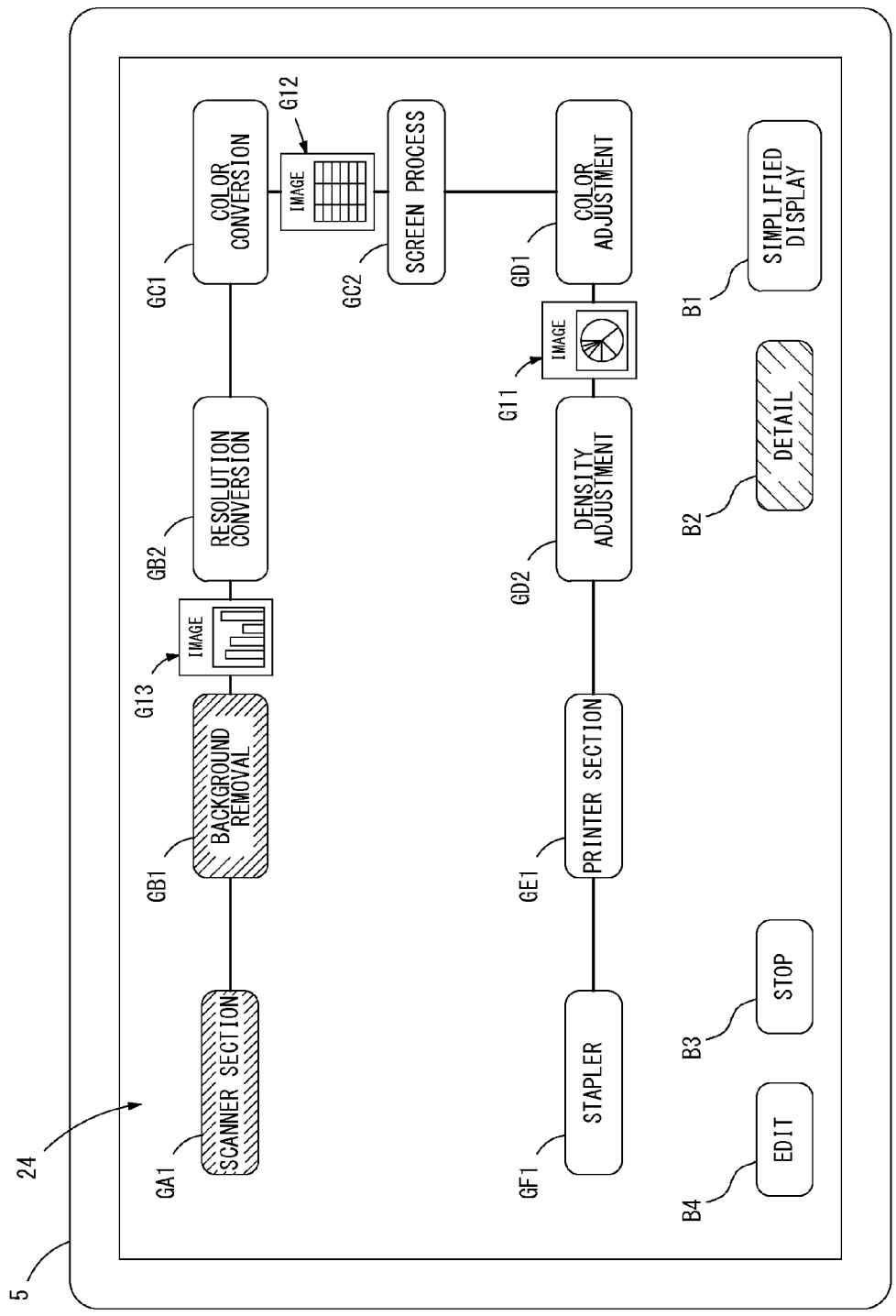
FIG. 9 is an example of a screen image displayed on the viewing area of the operational panel until the image processing device completes execution of the job after starting it.

FIG. 9 is an example of the screen image showing the processing path in detail. By tapping the detail key B2, the process detail of the processing performed by each of the image inputting unit 10, the image processing unit 12, the image outputting unit 13 and the post-processing device 1b is shown in detail as shown in FIG. 9. FIG. 9 shows an example of executing the copy job on the image processing device 1. The processing path to process the image data includes a process block GA1 corresponding to the scanner section 2, process blocks GB1 and GB2 corresponding to the respective background removal 51 and resolution conversion 52 performed by the image adjusting part 50, process blocks GC1 and GC2 corresponding to the respective color conversion 61 and screen process 65 performed by the image converting part 60, process blocks GD1 and GD2 corresponding to the respective color adjustment 72 and density adjustment 74 performed by the image correcting part 70, a process block GE1 corresponding to the printer section 3 and a process block GF1 corresponding to the stapler 49. Those multiple process blocks GA1 to GF1 are connected with a path line in accordance with a process order and shown in detail on the viewing area. Inside each of the process blocks GA1 to GF1 shown in the processing path, the image processing information specifying the process detail of the processing to process the image data is displayed in a text format, for example.

In response to starting execution of the job, the image processing device 1 of the present preferred embodiment shows the processing path to process the image data from the processing after the image inputting unit 10 inputs the image data to the processing until the image outputting unit 13 outputs the image on the viewing area of the operational panel 5. With displaying the processing path, the image processing device 1 of the present preferred embodiment moves the icon image corresponding to the image data sequentially along the processing path. The user is allowed to easily recognize what processing is carried out during execution of the job. The user is therefore allowed to notice the mistake before execution of the job is complete if there is the mistake in the settings of image processing or the way to output configured for the job.

The user taps the stop key B3 shown on the viewing area of the operational panel 5 or the icon image G11, G12 or G13 moving through the processing path so that he or she is allowed to temporarily suspends execution of the job. To be more specific, in response to detecting that the stop key B3 or any of the icon images G11, G12 and G13 is tapped, the manipulation detecting part 33 sends the operation information containing the stop signal to the job controller 15. When receiving the operation information containing the stop signal during execution of the job, the job controller 15 temporarily suspends the operation of each image inputting unit 10, image processing unit 12, image outputting unit 13 and post-processing device 1b, thereby temporarily suspending a series of operations performed for execution of the job. The job controller 15 temporarily suspends the image processing of every processing process performed by the image processing unit 12. The job may be the one to produce the printed output by driving the printer section 3 by the image outputting unit 13. In this case, if the feeding operation to produce the printed output based on the image data has already been started, the feeding operation is not allowed to be suspended in the middle of the operation. When the feeding operation has already been started on the printer section 3, the job controller 15 continues the processing to produce the printed output for the paper being fed and suspends the feeding operation for the papers to be fed after the suspension.

Figure 10:
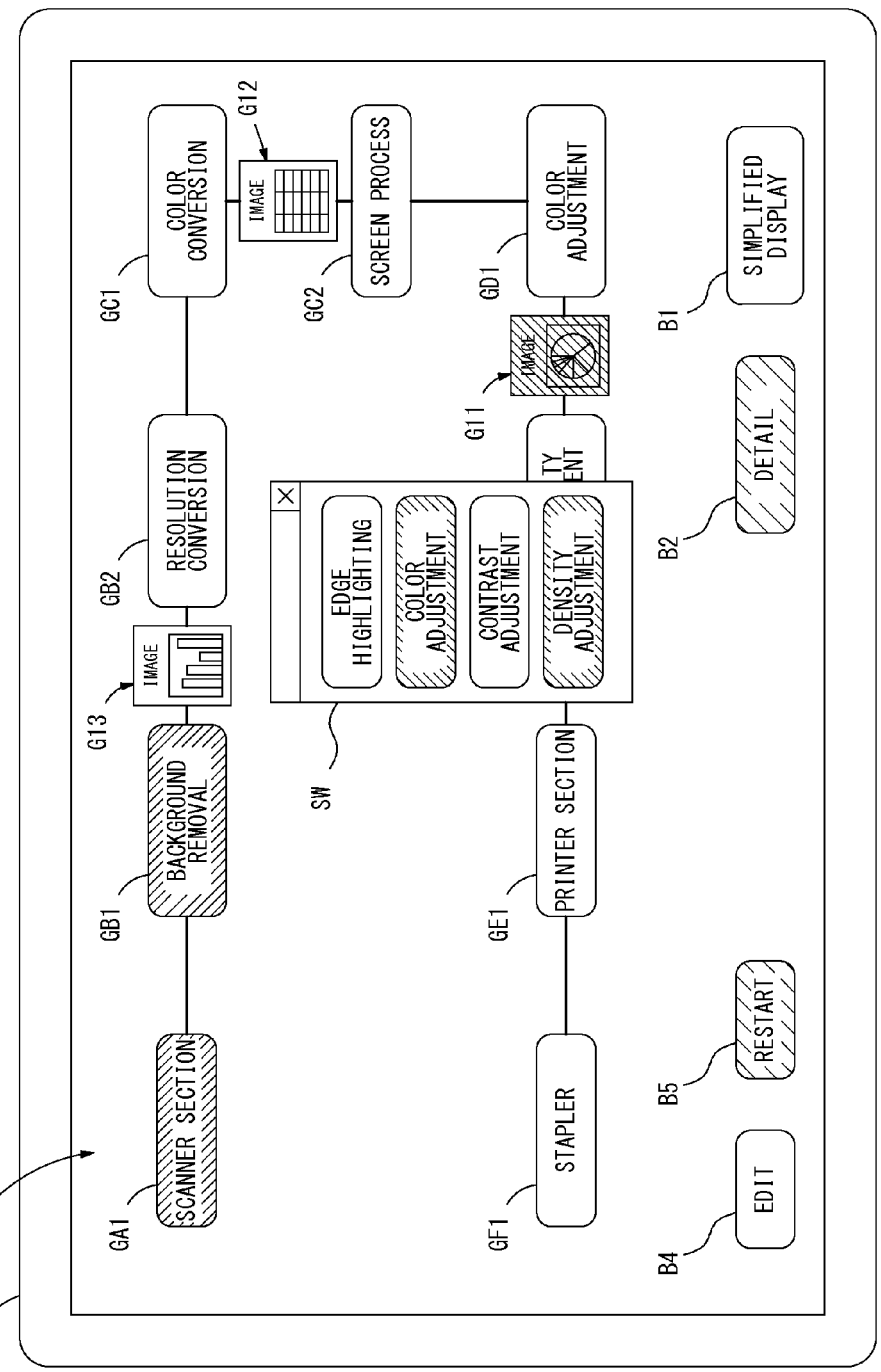
FIG. 10 is an example of a screen image displayed on the viewing area of the operational panel until the image processing device completes execution of the job after starting it.

FIG. 10 shows an example of the screen image when execution of the job is temporarily suspended with the screen image of FIG. 9 being displayed. As shown in FIG. 10, in response to temporarily suspending execution of the job, the stop key B3 shown at the bottom of the screen image changes to a restart key B5 for restarting execution of the job. While execution of the job is being suspended, the user is allowed to make change in the image processing settings, or the settings of the process order of the processing to process the image data or the way to output.

In the example of FIG. 10, the icon image G11 is tapped by the user while execution of the job is being temporarily suspended. In this case, the display controlling part 32 identifies the icon image G11 tapped by the user based on the operation information received from the manipulation detecting part 33, and displays the icon image G11 differently from other icon images. The display controlling part 32 also identifies a position of the icon image G11 tapped by the user in the processing path and displays a list of the processing executable at the time as a sub window SW as shown in FIG. 10. The sub window SW includes processing icons already configured for the job in execution and processing icons not configured for the job. Those processing icons are displayed differently. This sub window SW is preferably displayed around the icon image G11 tapped by the user. The user taps the processing icon included in the sub window SW, thereby making change in the process detail of the processing to process the image data corresponding to the selected icon image G11. To be more specific, the user is allowed to cancel the processing already configured for the job in execution or to change the parameter for performing the processing to process the image data corresponding to the icon image G11. Further, the user is allowed to additionally configure the processing different from the one already configured for the job in execution as the processing to process the image data corresponding to the icon image G11. As described above, the user is allowed to delete or make change in the settings of the processing performed as the series of the operations during execution of the job, or add the new processing by tapping the sub window SW and the processing icon.

FIG. 10 shows the example when the icon image G11 of single page is selected by the user and the process detail of the processing to process the image data of the single page is separately changed. If, for example, the icon image G10 is selected with the icon image G10 for the job is being displayed as shown in FIG. 7, the user is allowed to change the process detail of the processing to process the image data of all pages all at once.

After detecting the above-described operation, the manipulation detecting part 33 determines the operation is to delete the processing, to make change the settings of the processing or to add the processing. The manipulation detecting part 33 generates the operation information containing the instruction information to the job controller 15 based on the determination result and sends the generated operation information to the job controller 15. In response to receiving the operation information from the manipulation detecting part 33, the job controller 15 changes the current settings on the image processing unit 12 and the image outputting unit 13 in accordance with the instruction information contained in the received operation information.

The settings for the image processing already performed by the image processing unit 12 may be changed or the image processing already performed by the image processing unit 12 may be deleted in response to the user's operation. In such a case, the job controller 15 discards the image data stored in the processed data storage part 11b of the image memory 11. The job controller 15 then gives an instruction to the image processing unit 12 to perform the image processing, the settings for which is changed, with the original image data stored in the input image data storage part 11a. So, if the image processing as the user not intended has already been executed, the image processing is again performed so that the image data as the user intended may be obtained.

The user taps the edit key B4 while execution of the job is being temporarily suspended. In such a case, an edit screen image not shown in figures is displayed on the viewing area of the display unit 24 of the operational panel 5. With the edit screen image, the user is allowed to freely edit the image data by checking the preview image of the image data stored in the processed data storage part 11b, for example. This allows the user to add data such as texts or images not contained in the image data obtained by the image inputting unit 10, for instance, in the middle of execution of the job.

Figure 11:
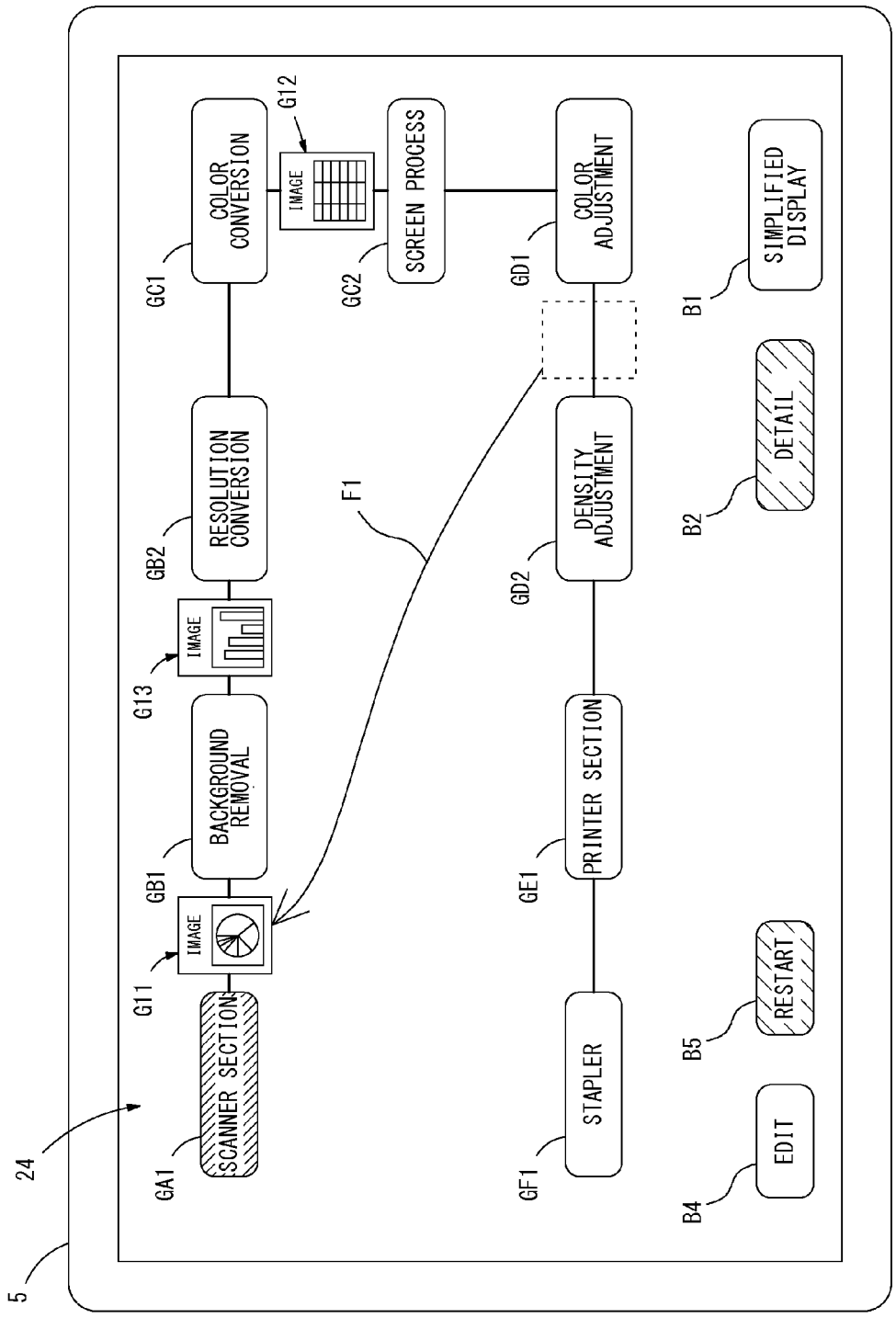
FIG. 11 is an example of a screen image displayed on the viewing area of the operational panel until the image processing device completes execution of the job after starting it and an example of user's operation.

The user makes the operation to the operational panel 5 to shuffle the order of the icon images G11, G12 and G13 corresponding to each page while execution of the job is being temporarily suspended. As a result, the user is allowed to shuffle the order of the image output from the image processing device 1. FIG. 11 shows an example of the screen image when the operation to shuffle the processing orders of the processing to process the image data. FIG. 11 shows the example when the user drags the icon image G11 in a direction shown with an arrow F1 while temporarily suspending execution of the job. This drag operation shown in FIG. 11 is to turn the icon image G11 back over the processing path. The display controlling part 32 moves the icon image G11 dragged by the user to the position behind the icon images G12 and G13 over the processing path.

The manipulation detecting part 33 generates the instruction information specifying to return the process status of the image data corresponding to the icon image G11 to the state before the background removal is performed based on the drag operation shown in FIG. 11. The manipulation detecting part 33 then sends the operation information containing the generated instruction information to the job controller 15. In response to receiving the operation information, the job controller 15 discards the image data corresponding to the icon image G11 stored in the processed data storage part 11b of the image memory 11. The job controller 15 then gives the instruction to the image processing unit 12 to perform the image processing from the start to the background removal 51 with the original image data corresponding to the icon image G11 stored in the input image data storage part 11a. The image processing unit 12 performs the image processing from the start to the background removal 51 with the original image data corresponding to the icon image G11. The process order to process the image data corresponding to the icon image G11 is shuffled, and the image data corresponding to the icon image G11 is processed after the image data corresponding to the icon images G12 and G13. In this case, the order for image output is also shuffled.

Figure 12:
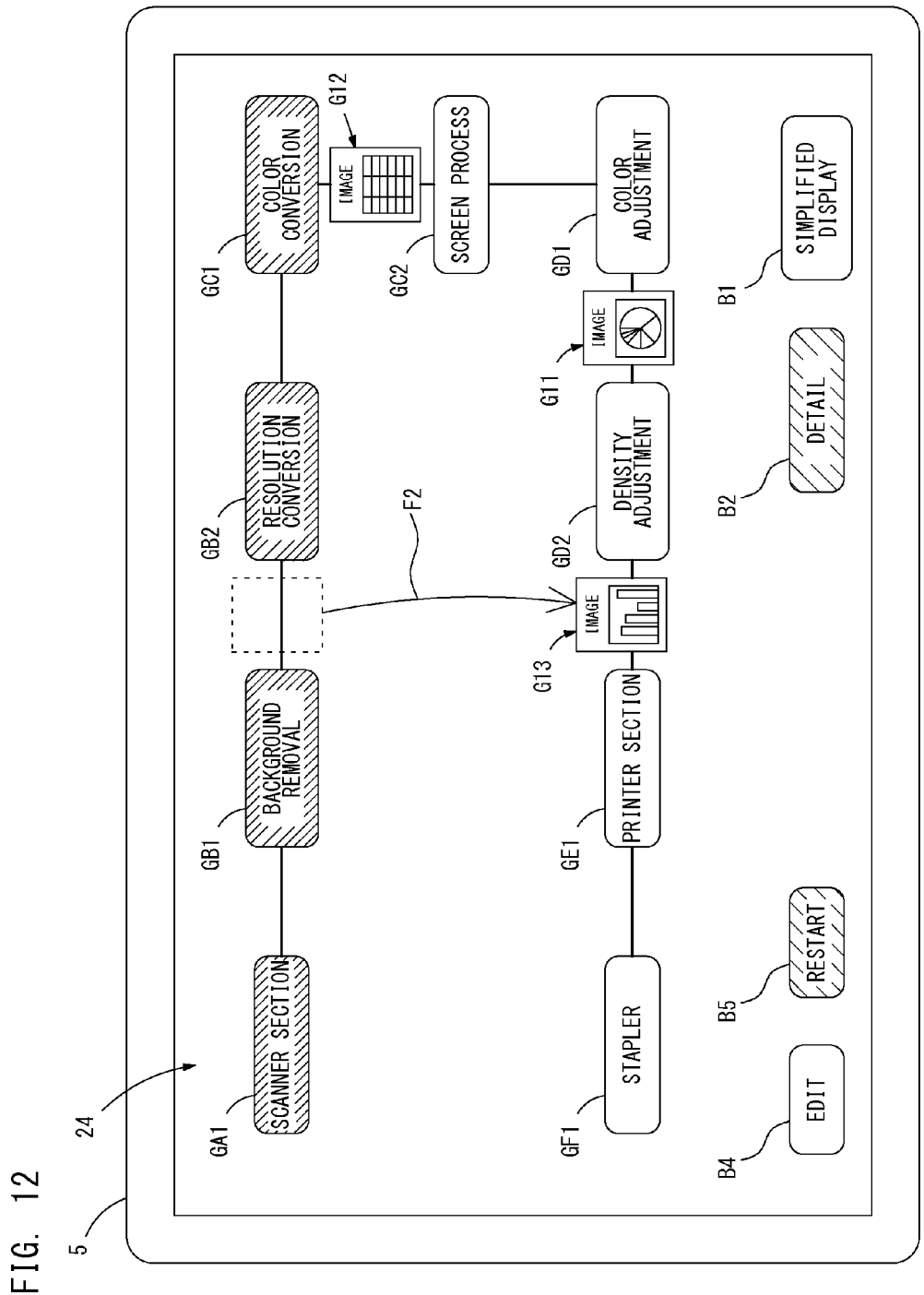
FIG. 12 is an example of a screen image displayed on the viewing area of the operational panel until the image processing device completes execution of the job after starting it and an example of user's operation.

FIG. 12 shows an example of the screen image when the operation to shuffle the processing order of the processing to process the image data is made. FIG. 12 shows the example when the user drags the icon image G13 in a direction shown with an arrow F2 while temporarily suspending execution of the job. This drag operation shown in FIG. 12 is to move the icon image G13 forward over the processing path. The display controlling part 32 moves the icon image G13 dragged by the user to the position ahead the icon images G11 and G12 over the processing path.

The manipulation detecting part 33 generates the instruction information specifying to advance the process status of the image data corresponding to the icon image G13 to the state before the image data is output to the printer section. The manipulation detecting part 33 then sends the operation information containing the generated instruction information to the job controller 15. In response to receiving the operation information, the job controller 15 gives the instruction to the image processing unit 12 to perform the image processing from the start to the processing outputting to the printer section 3 to process the image data corresponding to the icon image G13 stored in the processed data storage part 11b of the image memory 11. Thus, the image processing unit 12 carries out only the processing to process the image data corresponding to the icon image G13 while temporarily suspending the processing to process the image data corresponding to the icon images G11 and G12. The process order to process the image data corresponding to the icon image G13 is shuffled, and the image data corresponding to the icon image G13 is processed before the image data corresponding to the icon image G11 and G12. So, the image data corresponding to the icon image G13 is processed as the image data of the first page.

The list of the executable processing may be displayed as the sub window SW around the icon image which is moved by the drag operation as shown in FIG. 10 when the user drags the icon image as shown in FIG. 11 or FIG. 12. If the sub window SW is displayed around the moved icon image, the user is allowed to make change in the settings of the image processing immediately after dragging the icon image. The list of the executable processing is displayed as the sub window SW around the moved icon image not only when the user drags the icon image. The list of the processing executable at the time may be displayed as the sub window SW as each processing is carried out during execution of the job.

The user may tap each process block GA1 to GF1 in the processing path while temporarily suspending execution of the job. In this case, the user is allowed to make change in the processing corresponding to each of the process block GA1 to GF1. The user may tap the process block GE1 corresponding to the printer section 3, for example. In such a case, the user is allowed to make change in the print settings from 1-sided printing to 2-sided printing or make change in the settings of the paper tray even in the middle of execution of the job. When the settings on the image outputting unit 13 is changed to produce the image output different from producing with the printer section 3, the printed output is not produced. In this case, the image output may be produced in another way different from being produced as the printed output.

Figure 13:
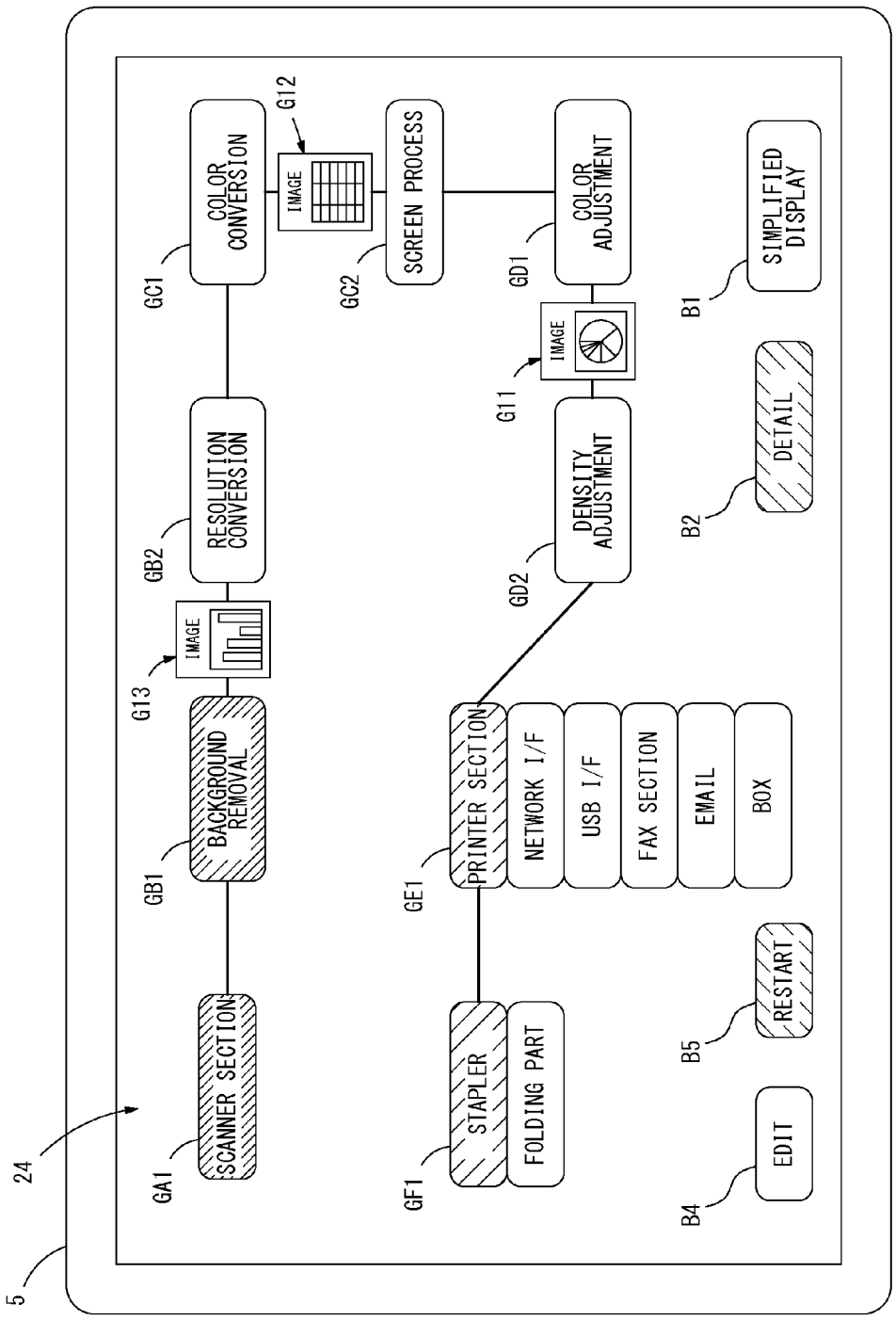
FIG. 13 is an example of a screen image displayed on the viewing area of the operational panel until the image processing device completes execution of the job after starting it.
Figure 14:
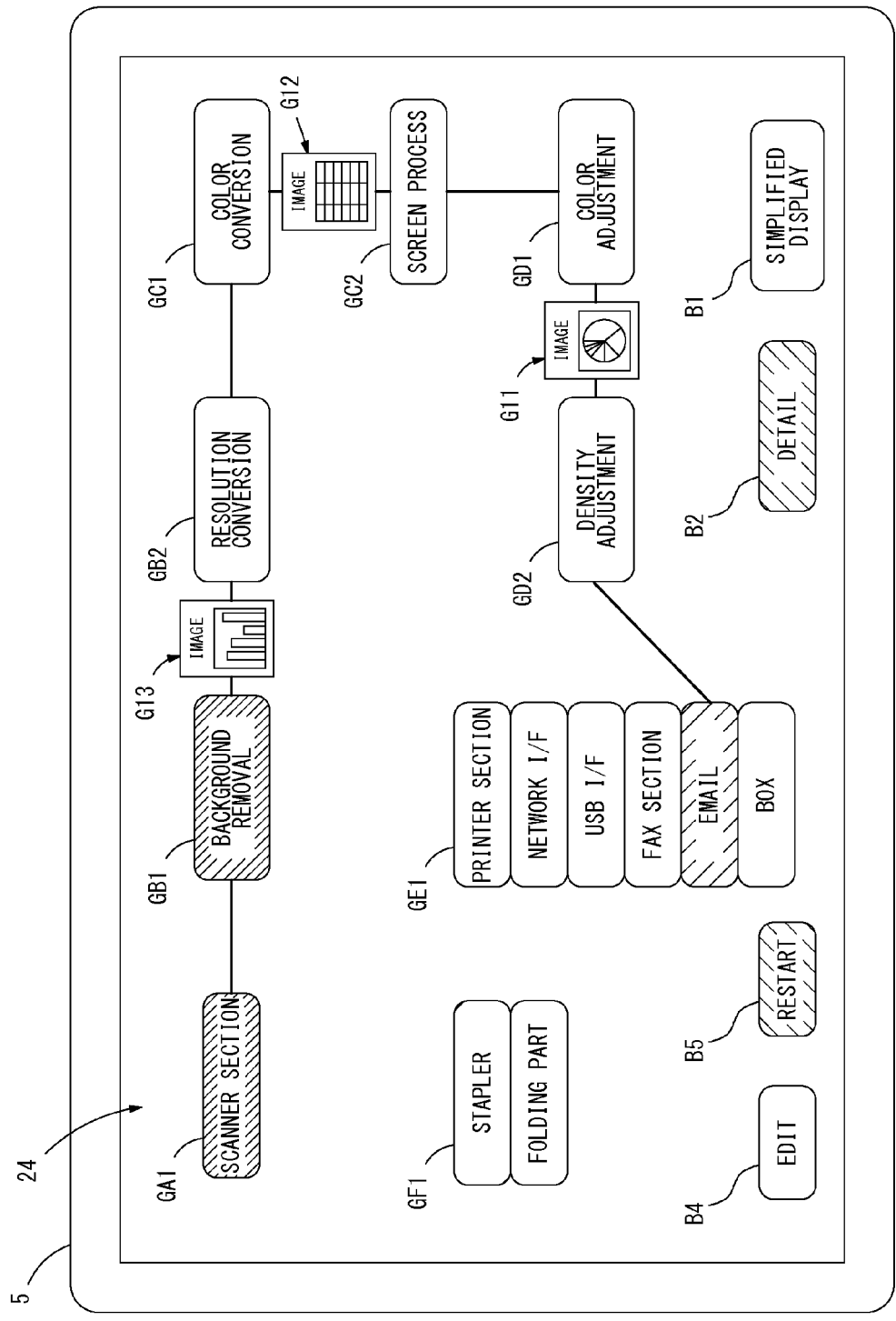
FIG. 14 is an example of a screen image displayed on the viewing area of the operational panel until the image processing device completes execution of the job after starting it.

FIG. 13 is an example of the screen image for changing the way to output. As described above, when the user taps the process block GE1 corresponding to the printer section 3 while execution of the job is temporarily suspended, for example, the list of the configurations (process blocks)

included in the image outputting unit 13, that are capable of outputting the image, is displayed as shown in FIG. 13. If it is configured to produce the printed output with the printer section 3 as the settings of the job, the list of the process executable on the post-processing device 1*b* is also displayed.

The user may tap again the process block GE1 corresponding to the printer section 3, for example, while the screen image as illustrated in FIG. 13 is displayed. In such a case, the sub window not shown in figures to change the settings for the printer section 3 is then appeared. The user is allowed to make change in the print settings from 1-sided printing to 2-sided printing or to make change in the settings of the paper tray by tapping the item in the sub window.

While the screen image as illustrated in FIG. 13 is displayed, the user may tap the process block different from the process block GE1 corresponding to the printer section 3 of the list of the configurations capable of outputting the image, or may connect the process block GD2, the one before the process block to connect, and the process block different from the process block GE1 corresponding to the printer section 3 by a path line. In such a case, the screen image as illustrated in FIG. 13 is switched to the one shown in FIG. 14. To be more specific, in the example of FIG. 14, the process block designated as the configuration to output the image of the image outputting unit 13 is changed from the printer section 3 to the email transmitting part 46.

Figure 15:
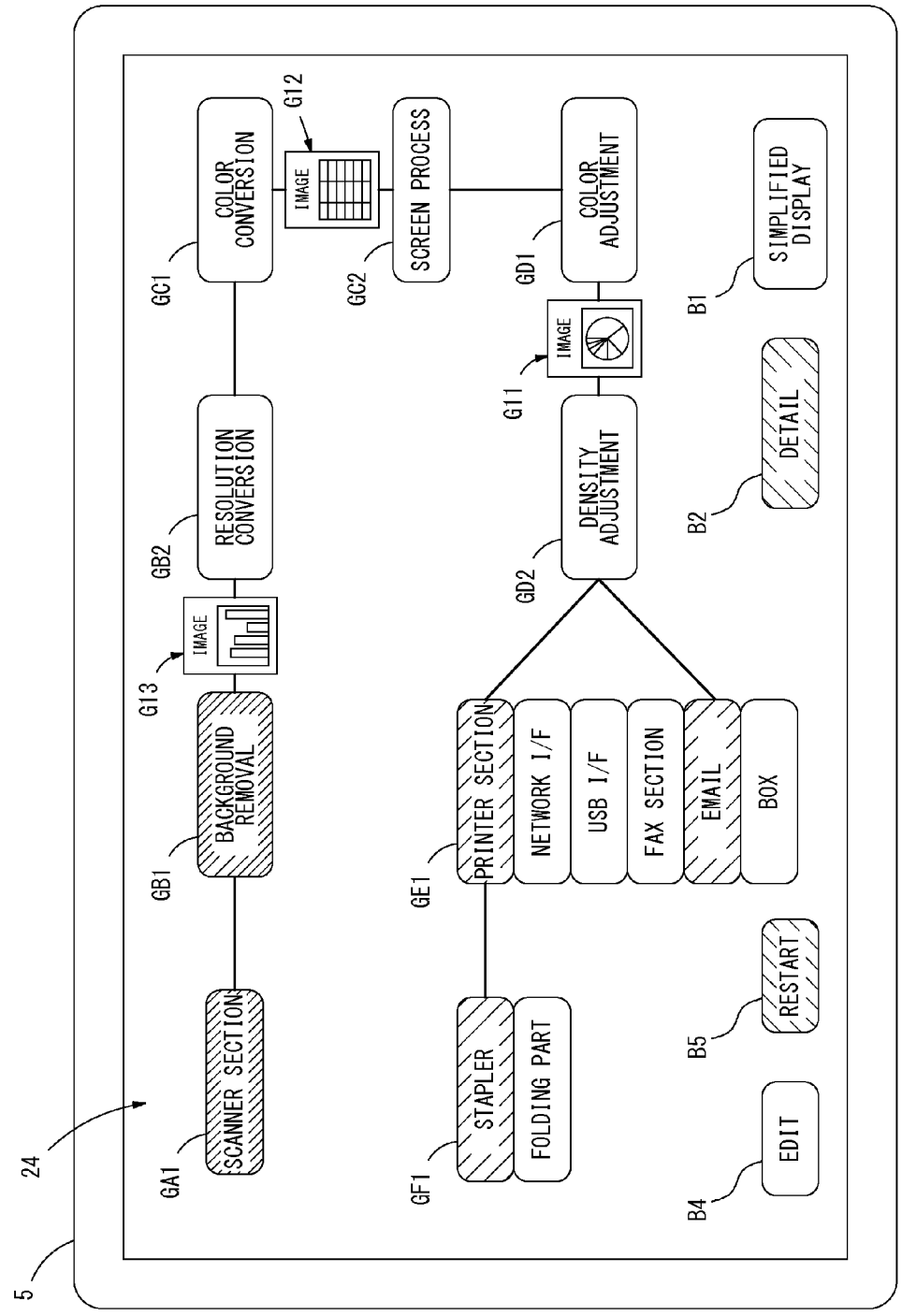
FIG. 15 is an example of a screen image displayed on the viewing area of the operational panel until the image processing device completes execution of the job after starting it.

The user may select more than one process block from the list of the configurations capable of outputting the image. FIG. 15 shows an example of the screen image when more than one process block designated as the configurations to output the image of the image outputting unit 13 is selected. In the example of FIG. 15, two process blocks corresponding to the printer section 3 and the email transmitting part 46 are selected as the process block designated as the configurations to output the image for image output of the image outputting unit 13. Thus, the user is allowed to add the way to output for image output even in the middle of execution of the job.

When more than one process block is selected, the manipulation detecting part 33 generates the instruction information to make change in the way to output for image output configured with the job, and sends the operation information containing the generated instruction information to the job controller 15. In response to receiving the operation information, the job controller 15 changes the settings of the image outputting unit 13. Thus, the way to output for image output may be changed to the way the user desires even in the middle of execution of the job.

Figure 16:
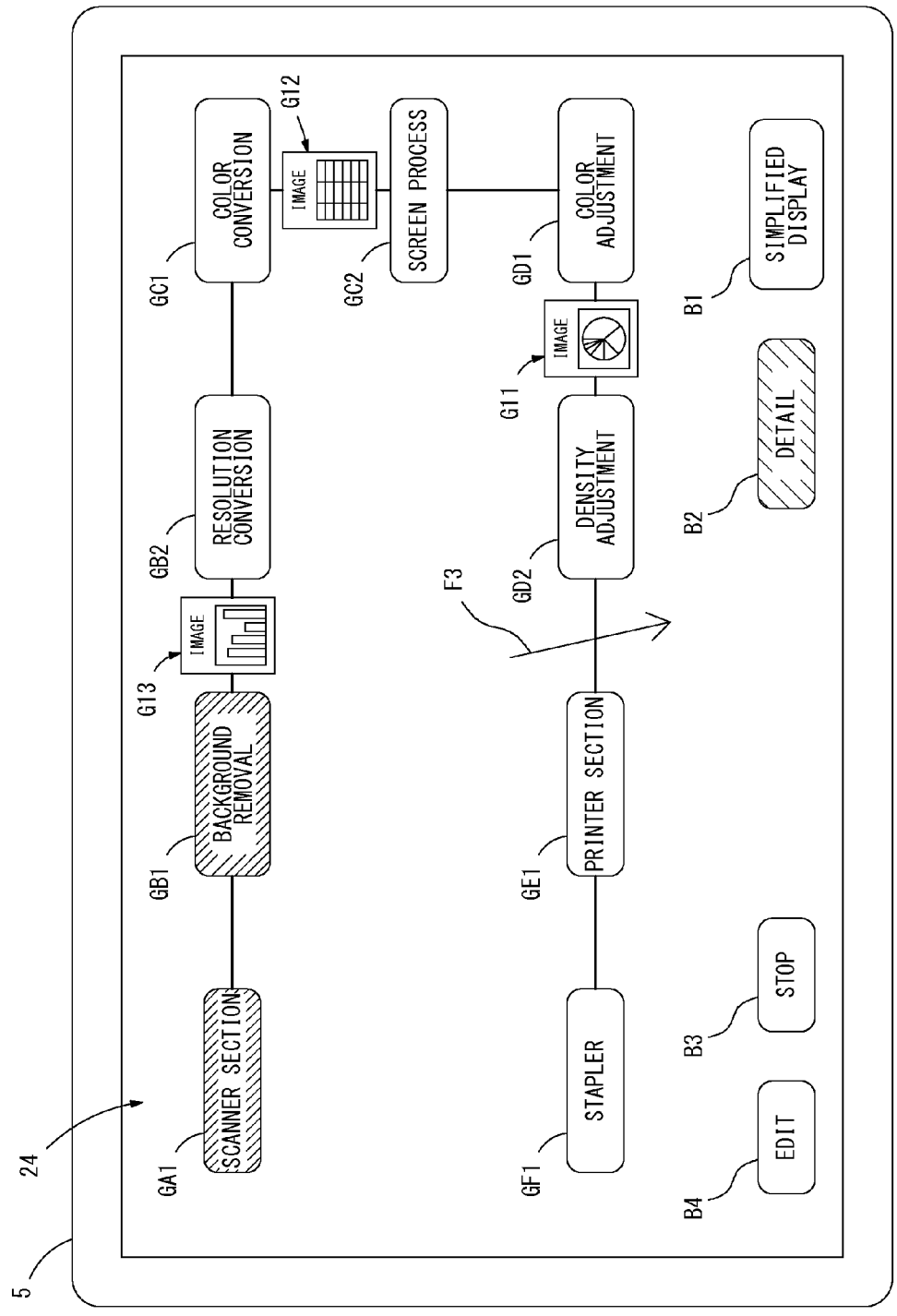
FIG. 16 is an example of a screen image displayed on the viewing area of the operational panel until the image processing device completes execution of the job after starting it and an example of user's operation.
Figure 17:
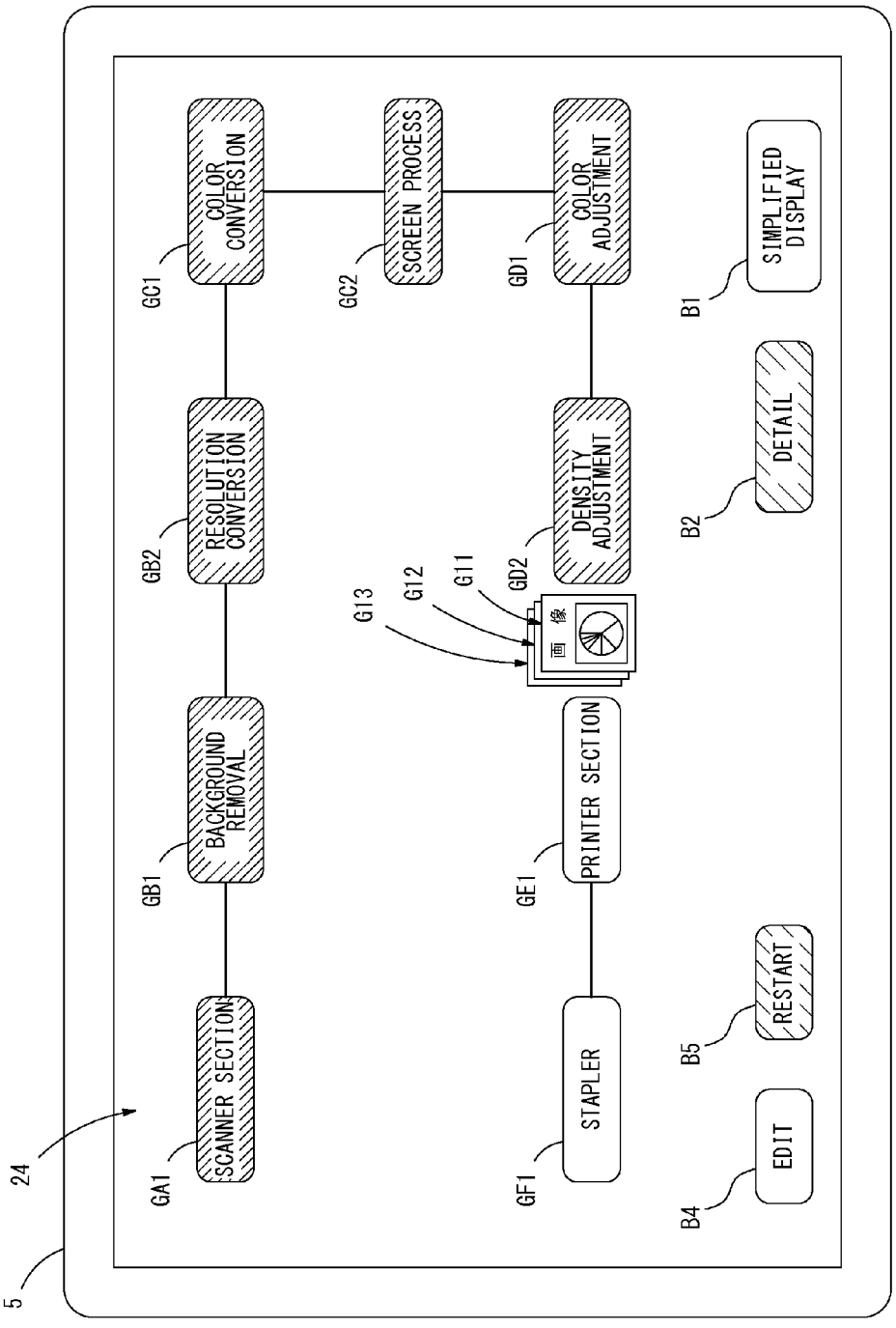
FIG. 17 is an example of a screen image displayed on the viewing area of the operational panel until the image processing device completes execution of the job after starting it.

The user is also allowed to temporarily suspend execution of the job by making the operation not described above. FIG. 16 shows an example of the operation. As shown in FIG. 16, for instance, the user may disconnects the path line connecting each process block in the processing path shown in the viewing area of the operational panel 5 in a direction shown with an arrow F3 while the job is being executed on the image processing device 1. With this disconnecting operation, the user is allowed to temporarily suspend execution of the job. This disconnecting operation specifies the position in the processing path, at the point of which execution of the job should be suspended. In response to the disconnecting operation, the screen image displayed on the viewing area of the operational panel 5 is switched from the one as illustrated in FIG. 16 to the one shown in FIG. 17. In the example of the screen image of FIG. 17, the path line disconnected by the user is not shown anymore, and the image processing to process the image data of each page corresponding to the icon images G11, G12 and G13 is suspended at the point of the disconnected path line.

In this case, the manipulation detecting part 33 identifies which path line in the processing path is disconnected. The manipulation detecting part 33 then generates the stop signal to temporarily suspend the image processing of the processing process after the disconnected path line of the whole image processing of the processing process performed by the image processing unit 12. The manipulation detecting part 33 sends the operation information containing the generated stop signal to the job controller 15. In response to receiving the operation information, the job controller 15 identifies the position to suspend the processing. The job controller 15 then controls the image inputting unit 10, the image processing unit 12 and the image outputting unit 13 to carry out the image processing from the start to the processing corresponding to the specified position, and temporarily suspends execution of the job by suspending the image processing of the processing process after the identified position.

If the image processing unit 12 formed from the hardware performs the processing, the image processing of the processing process after the identified suspending position may have already been carried out by the image processing unit 12 at the point of time at which the user disconnects the path line as described above. In this case, the job controller 15 discards the image data generated by the image processing after the suspending position. The job controller 15 then cause the image processing unit 12 to perform again the image processing from the start to the processing before the suspending position with the original image data and to temporarily suspend the processing after the suspending position. Even when the image processing unit 12 formed from the software performs the processing, the process speed on the image processing unit 12 formed from the software is sometimes faster than the speed at which the icon images G11, G12 and G13 move. In such a case, the process as described above is performed and the processing is temporarily suspended.

When the operation to disconnect the path line is made, execution of the job on the image processing device 1 is not immediately suspended. The processing until the position at which the path line is disconnected is carried out and the processing is suspended after the position. The user makes the above-described operation to the operational panel 5 after execution of the job on the image processing device 1 is suspended. As a result, the user is allowed to make change in the settings of the image processing on the image processing unit 12 or the way to output with the image outputting unit 13.

Figure 18:
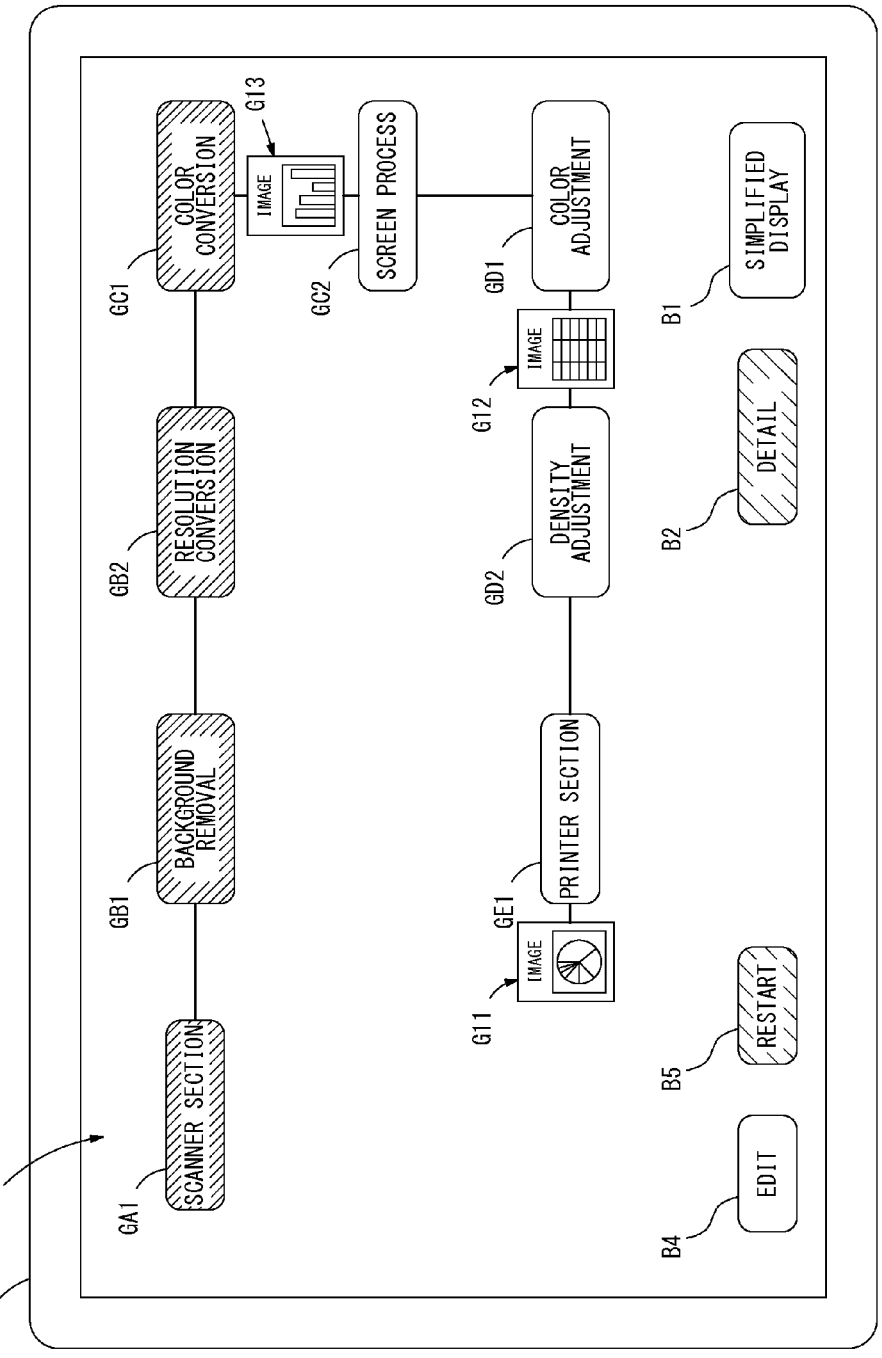
FIG. 18 is an example of a screen image displayed on the viewing area of the operational panel until the image processing device completes execution of the job after starting it.

It might happen that the paper has already fed on the printer section 3 at the time at which the user gave the instruction to suspend execution of the job on the operational panel 5, and the printed output based on at least the image data of the first page has been produced. Furthermore, the user may notice that the print settings not as intended are configured after checking the printed output produced based on the image data of the first page, and he or she may suspend execution of the job at the time he or she notices the mistake. FIG. 18 shows a screen image when the job is suspended after the printed output based on at least image data of the first page is produced. FIG. 18 shows an example when the printed output based on at least the image data of the first page has already been produced at the time at which the user suspended execution of the job. In the present preferred embodiment, even in such a situation, the image data of the first page is stored in the image memory 11. The user, therefore, drags and moves the icon image G11 corresponding the image data based on which the printed output has already been produced in a direction shown with an arrow F4 of FIG. 19, thereby changing the settings of the image processing unit 12 corresponding to the color settings to full color printing. Thus, the user is allowed to make the image processing device 1 produce the printed output again.

Figure 19:
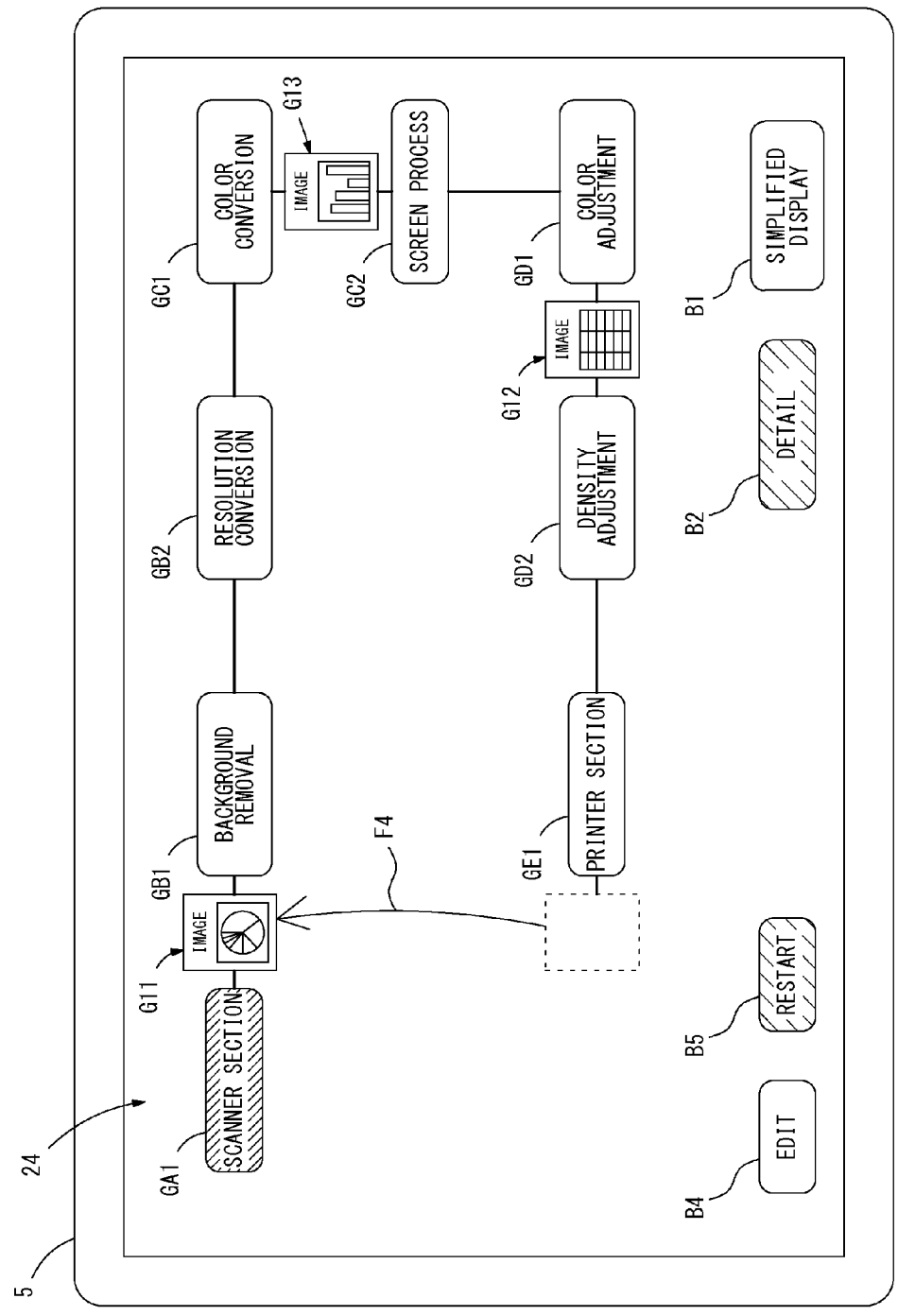
FIG. 19 is an example of a screen image displayed on the viewing area of the operational panel until the image processing device completes execution of the job after starting it and an example of user's operation.

The manipulation detecting part 33 generates the instruction information specifying to perform the processing from the position to which the icon image G11 is dragged and moved with the original image data corresponding to the first page based on which the printed output has already been produced in accordance with the drag operation of the icon image G11 as shown in FIG. 19. The manipulation detecting part 33 then sends the operation information containing the generated instruction information to the job controller 15. In response to receiving the operation information, the job controller 15 gives instructions to the image processing unit 12 and the image outputting unit 13 to read the original image data corresponding to the dragged icon image G11 and perform again the image processing to process the image data. The user may notice his or her mistake on the print settings in the middle of execution of the job. Even in such a case, execution of the job is allowed be started over again by efficiently using the image data once obtained by the image inputting unit 10. Thus, the document is not necessary to be read again, resulting in enhanced operability.

The user makes the above-described operation to make change in the settings of the processing to output the image of at least one set or to make change in the process order of the series of the operations performed during execution of the job. After making the operation, the user taps the restart key B5 to give the instruction to cancel the temporal suspension and restart execution of the job. The manipulation detecting part 33 then generates the restart signal and sends the operation information containing the generated restart signal to the job controller 15. In response to receiving the operation information containing the start signal from the operational panel 5, the job controller 15 brings each of the image inputting unit 10, the image processing unit 12, the image outputting unit 13 and the post-processing device 1b into operation to restart execution of the job which has been suspended. The image processing device 1 restarts execution of the job after changing the settings as configured by the user so that it is allowed to output the image as the user desires with one execution of the job.

Figure 20:
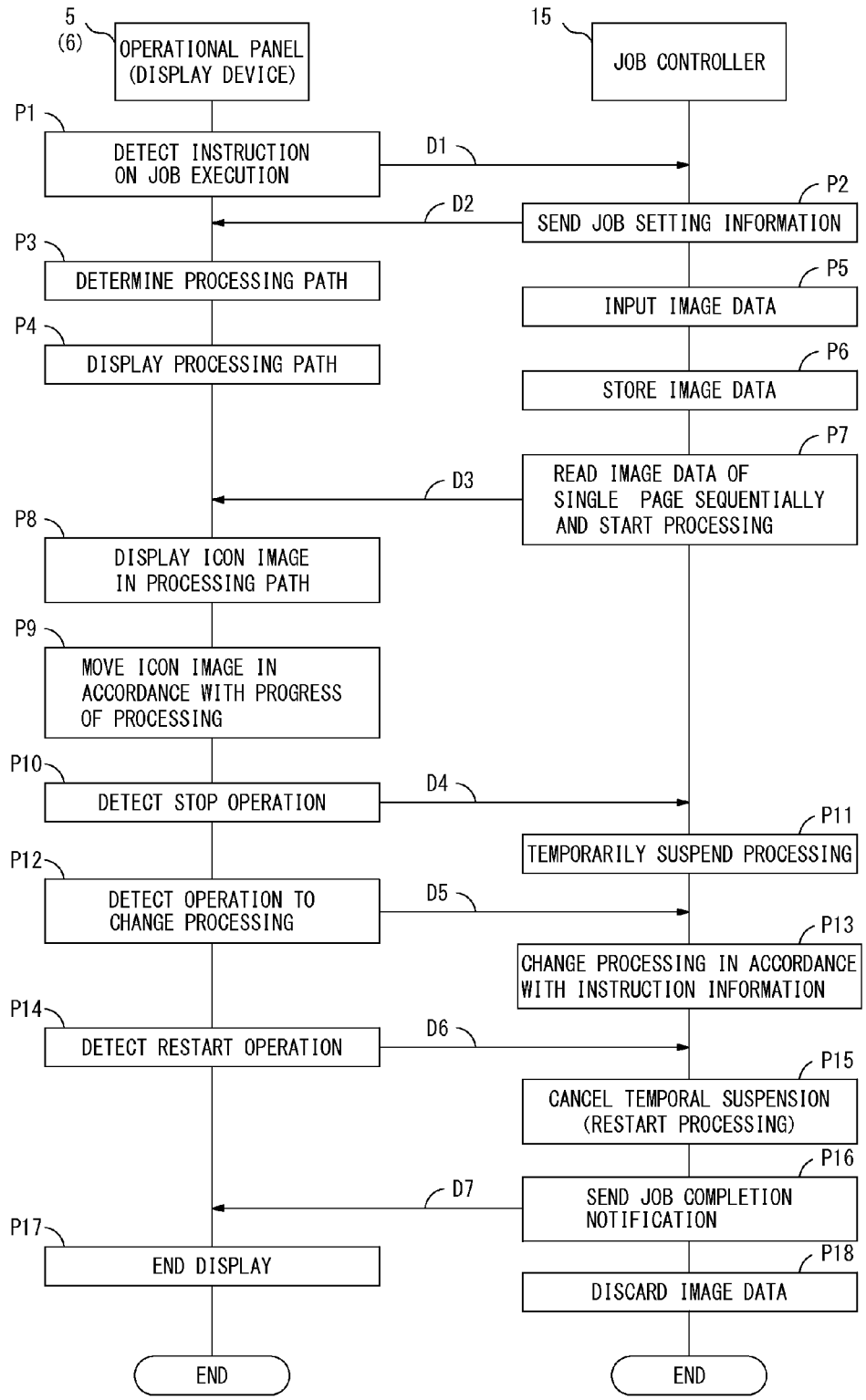
FIG. 20 is a flow diagram explaining an exemplary sequential procedure performed by the operational panel and a job controller in cooperation with each other when the job is executed on the image processing device.

FIG. 20 is a flow diagram explaining an exemplary sequential procedure performed by the operational panel 5 and the job controller 15 when the job is executed on the image processing device 1. In the example of FIG. 20, the user operates the operational panel 5 to give the instruction on execution of the job, and execution of the job is started. As detecting the instruction on execution of the job (process P1), the operational panel 5 sends operation information D1 instructing to start execution of the job to the job controller 15. After receiving the operation information D1, the job controller 15 sends setting information D2 of the job specifying the settings configured in advance by the user to the operational panel 5 (process P2). The setting information D2 contains information specifying the process detail of the processing performed by each of the image inputting unit 10, the image processing unit 12, the image outputting unit 13 and the post-processing device 1b during execution of the job. The operational panel 5 obtains the setting information D2 of the job from the job controller 15, thereby determining the processing path of the processing performed during execution of the job (process P3), and displaying the processing path on the viewing area of the display unit 24 (process P4). At the same time, the job controller 15 starts execution of the job and inputs the image data to be the target of execution of the job (process P5). The job controller 15 then stores the input image data in the image memory 11 (process P6).

After storing the image data to be the target of execution of the job in the image memory 11, the job controller 15 reads the image data of the single page sequentially and controls the image processing unit 12 and the image outputting unit 13 to start execution of the job (process P7). The job controller 15 sends an image reading signal D3 to the operational panel 5 at the time at which the image data of the single page is read sequentially by the image processing unit 12. In response to receiving the image reading signal D3, the operational panel 5 displays the icon image in the processing path (process P8). With displaying the icon image, the operational panel 5 determines the speed of moving the icon image in the processing path. The operational panel 5 moves the icon image displayed in the processing path based on the determined speed of moving the icon image (process P9). The processing in the processes P7 to P9 is repeatedly performed every time the image data of the single page is read.

When detecting the stop operation by the user before completing whole processing for execution of the job (process P10), the operational panel 5 sends operation information D4 containing the stop signal to the job controller 15. As receiving the operation information D4 containing the stop signal, the job controller 15 temporarily suspends the processing in execution (process P11). While the processing is being temporarily suspended, the operational panel 5 may detect the user's operation to change the process detail (process P12). The operational panel 5 generates operation information D5 containing the instruction information based on the detected operation and sends the generated operation information D5 to the job controller 15. After receiving the operation information D5, the job controller 15 changes the processing that should be carried out during execution of the job in accordance with the instruction information (process P13). In order to change the processing that has already been completed, the job controller 15 discards the image data that has already been processed from the image memory 11 and changes the process detail in accordance with the instruction information. The job controller 15 then gives the instruction to the image processing unit 12 to perform the processing again with original image data. In response to detecting the restart operation by the user (process P14), the operational panel 5 generates operation information D6 containing the restart signal to the job controller 15. After receiving the operation information D6, the job controller 15 cancels the temporal suspension and restarts execution of each processing included in the series of operations (process P15). The processing in the processes P10 to P15 is repeatedly performed every time the user's operation is detected in the middle of execution of the job.

After execution of the job is complete, the job controller 15 sends a job completion notification D7 to the operational panel 5 (process P16). The operational panel 5 then ends displaying the processing path corresponding to the job (process P17). Furthermore, after execution of the job is complete, the job controller 15 discards the image data in the image memory 11 (process P18). At this time, the job controller 15 also discards the original image data in the input image data storage part 11a.

The operational panel 5 and the job controller 15 perform operations in cooperation with each other during execution of the job as described above. As a result, it allows the user to recognize the process detail of the processing performed from the start to completion of execution of the job. Also, the process detail may be changed based on the user's operation.

Figure 21:
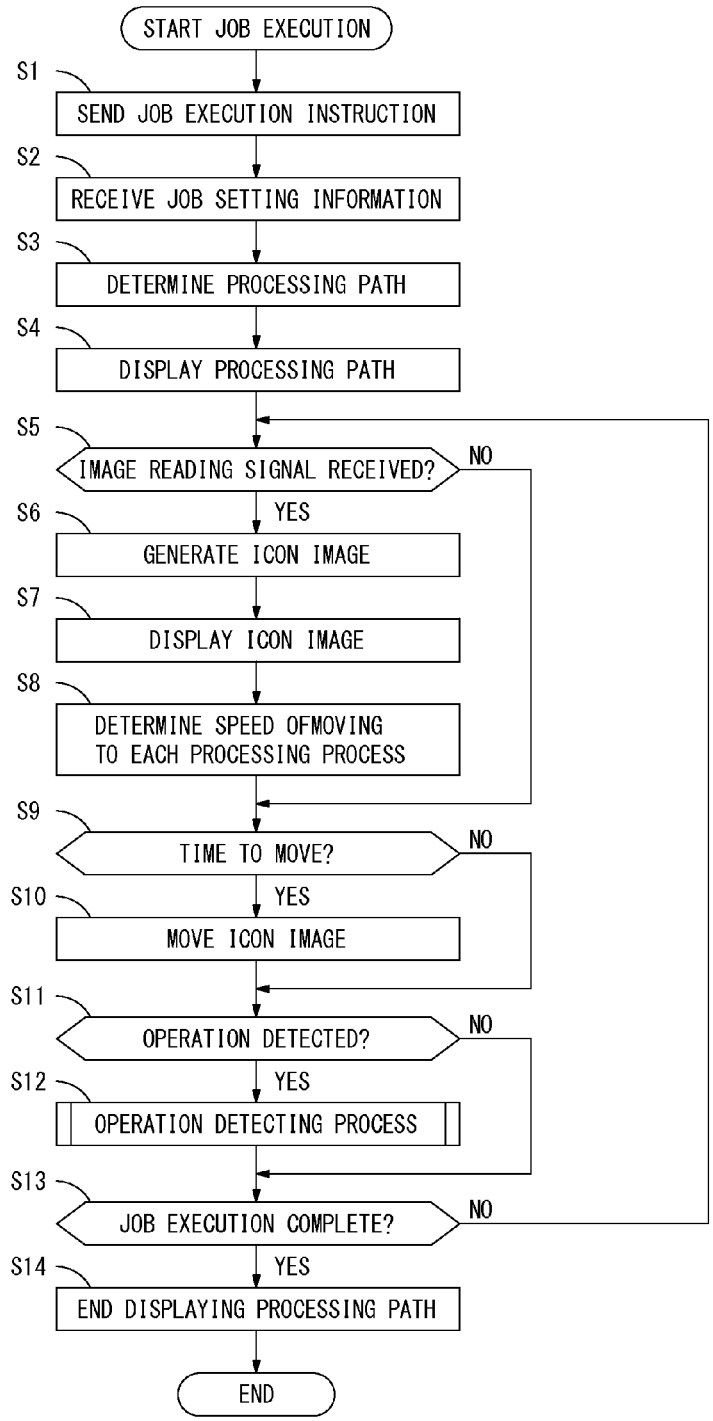
FIG. 21 is a flow diagram explaining an exemplary sequential procedure of the process performed on the operational panel (display device)
Figure 22:
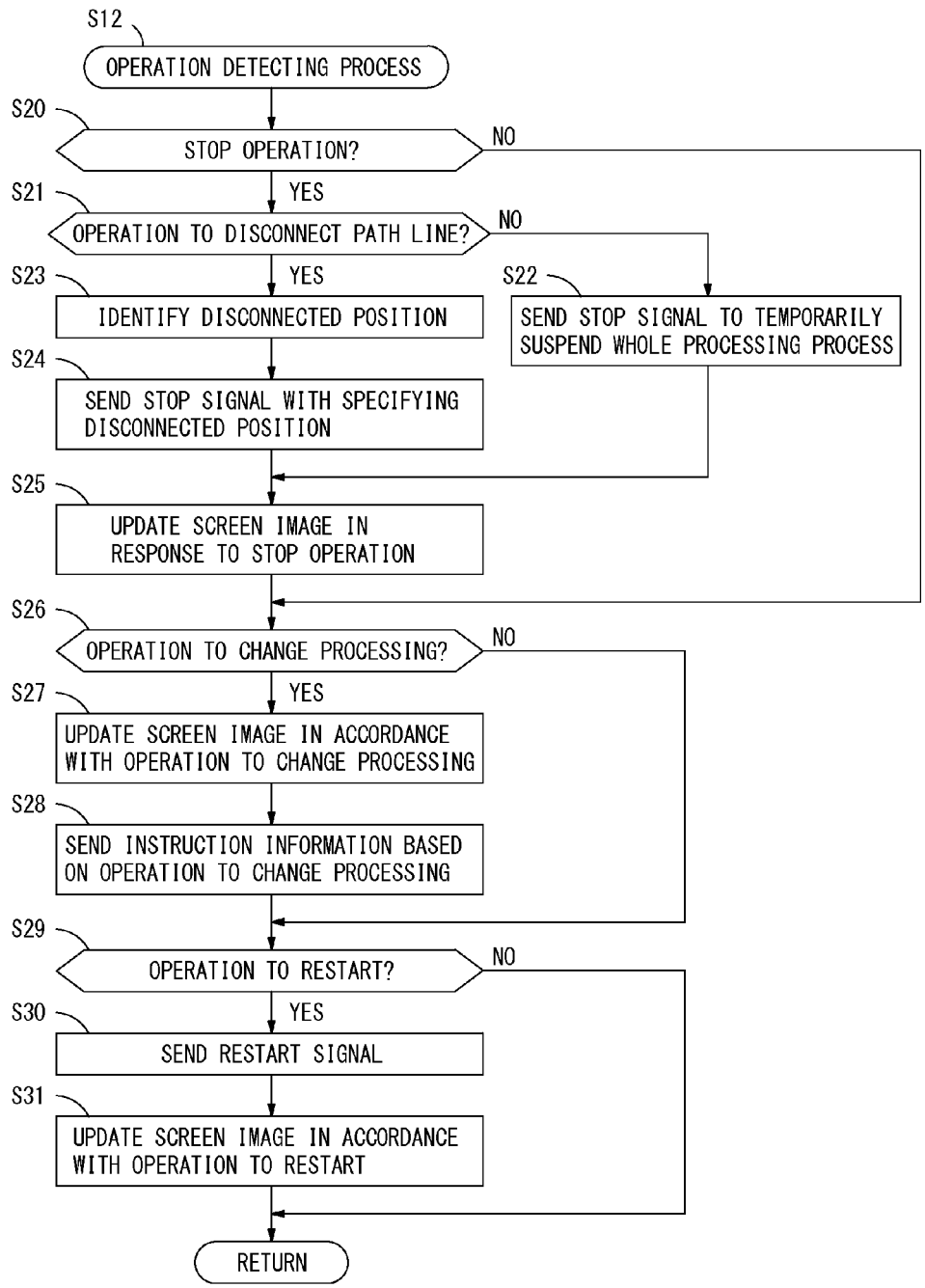
FIG. 22 is a flow diagram explaining the detailed exemplary sequential procedure of an operation detecting process.

The detailed sequential procedure on the operational panel 5 from the start to completion of execution of the job is described next. FIGS. 21 and 22 are flow diagrams explaining exemplary sequential procedures of the process performed on the operational panel 5. This process is performed upon execution of the aforementioned program 23 by the CPU 20 of the operational panel 5 in response to the instruction on execution of the job, for example.

As shown in FIG. 21, in response to detecting the user's instruction on execution of the job, the operational panel 5 sends the instruction on execution of the job to the job controller 15 (step S1). The operational panel 5 then receives the setting information of the job from the job controller 15 (step S2). As obtaining the setting information of the job, the operational panel 5 determines the processing path of the series of the operations performed during execution of the job (step S3), and displays the determined processing path on the viewing area of the display unit 24 (step S4).

After receiving the image reading signal D3 of the image data from the job controller 15 (when a result of step S5 is YES), the operational panel 5 generates the icon image corresponding to the image data (step S6). The operational panel 5 displays the generated icon image behind the process block GA corresponding to the image inputting unit 10 in the processing path (step S7). The operational panel 5 obtains the information such as size information of the image data from the job controller 15 to determine the speed of moving the icon image displayed in the processing path in step S7 to each following processing block (step S8). In response to detecting that the time to move the icon image has arrived (when a result of step S9 is YES), the operational panel 5 performs the icon image moving process to move the icon image displayed in the processing path to the next process block along the processing path (step S10).

After displaying the processing path on the viewing area of the display unit 24, the operational panel 5 may detect the user's operation (when a result of step S11 is YES). In this case, the operational panel 5 performs the operation detecting process (step S12). In this operation detecting process, execution of the job is temporarily suspended, the process detail of the series of the operations performed during execution of the job is changed, or execution of the job is restarted.

The operational panel 5 repeatedly performs the process in step S5 to S12 as described above until execution of the job is complete (step S13). After execution of the job is complete on the image processing device 1 (when a result of step S13 is YES), the operational panel 5 ends displaying the processing path on the viewing area of the display unit 24. The operational panel 5 returns the screen image displayed on the viewing area of the display unit 24 to the initial screen image before execution of the job (step S14).

FIG. 22 is a flow diagram explaining the detailed exemplary sequential procedure of the operation detecting process (step S12). Upon start of the process, the operational panel 5 determines whether or not the operation made by the user is the stop operation to temporarily suspend execution of the job (step S20). When the user's operation is the stop operation (when a result of step S20 is YES), the operational panel 5 further determines if the user's operation is to disconnect the path line of the processing path displayed on the viewing area of the display unit 24 (step S21). When the operation is not to disconnect the path line of the processing path (when a result of step S21 is NO), the operational panel 5 sends the stop signal to temporarily suspend the whole processing (step S22). When the operation is to disconnect the path line of the processing path (when a result of step S21 is YES), the operational panel 5 identifies the position at which the path line of the processing path is disconnected (step S23). The operational panel 5 also identifies the processing process after the position at which the path line is disconnected. The operational panel 5 sends the stop signal to temporarily suspend the processing process with specifying the processing process after the position at which the path line is disconnected (step S24). After sending the stop signal in step S22 or step S24, the operational panel 5 updates the screen image displayed on the viewing area of the display unit 24 to show that it has been the temporal suspension in response to the user's stop operation (step S25). When the user's operation is not the stop operation (when a result of step S20 is NO), the process in step S21 to 25 is not performed and skipped to step S26.

The operational panel 5 then determines whether or not the user's operation is to change the processing performed during execution of the job (step S26). When the operation is to change the processing performed during execution of the job (when a result of step S26 is YES), the operational panel 5 updates the image processing information or the process block displayed on the viewing area of the display unit 24 in accordance with the user's operation to change the processing (step S27). The operational panel 5 then sends the instruction information based on the user's operation to change the processing to the job controller 15 (step S28). When the user's operation is not to change the process detail (when a result of step S26 is NO), the process in step S27 and S28 is not performed and skipped to step S29.

The operational panel 5 determines whether or not the user's operation is to restart the job which is being temporarily suspended (step S29). When the operation is to restart the processing (when a result of step S29 is YES), the operational panel 5 sends the restart signal to the job controller 15 (step S30). The operational panel 5 updates the screen image displayed on the viewing area of the display unit 24 to the one indicating that the job is in execution from the one indicating that the job is in temporal suspension in accordance with the user's operation to restart the processing (step S31). When the user's operation is not to restart the processing (when a result of step S29 is NO), the process in step S30 and S31 is not performed.

With performing the above-described process, the operational panel 5 is allowed to make the user check the process detail or the process order of the series of the operation performed from the start to completion of execution of the job. The user is allowed to find mistakes on the settings before execution of the job is completed by checking the screen image displayed on the viewing area of the operational panel 5. When the user finds the mistake on the settings, he or she makes operation to the operational panel 5, thereby making change in the process detail or the process order of the series of the operations performed during execution of the job even when execution of the job has already been started. The user, therefore, is not required to start over the operation to configure the preliminary setting of the job after cancelling the job in execution, resulting in enhanced operability.

The aforementioned program 23 may be installed on a portable terminal such as one of general tablet terminals as an application program, for example. With execution of the program 23 on the portable terminal, the portable terminal may be served as the portable display device 6 the same as the operational panel 5 as described above.

As described above, as execution of the job relating to the image processing is started, the image processing device 1 of the present preferred embodiment displays the processing path to process the image data followed from the time at which the image data is input to the image inputting unit 10 to at least the time at which the image is output by the image outputting unit 13 on the viewing area of the display unit 24, and moves the icon image corresponding to the image data along the processing path displayed on the viewing area of the display unit 24. The image processing device 1 may detect the operation on the screen image as the icon image is being displayed on the processing path displayed on the viewing area of the display unit 24. In this case, the image processing device 1 temporarily suspends the processing on the image processing unit 12 or the image outputting unit 13 and changes the settings of the image processing on the image processing unit 12 or the settings of the way to output on the image outputting unit 13 in accordance with the user's operation detected by the manipulation detecting part 33. Thus, the user is allowed to easily check the detail of the series of the operations carried out during execution of the job while the job is being executed and to make change in the settings of the process detail or the process order of the processing to process the image data included in the series of the operations even in the middle of execution of the job.

On the image processing device 1 of the present preferred embodiment, the image processing unit 12 reads the image data of the single page sequentially from the memory 11 and performs the image processing to process the image data of multiple pages in accordance with the processing process set in advance in parallel. As the image processing unit 12 performs the image processing to process the image data of multiple pages in parallel, the image processing device 1 displays the plurality of icon images corresponding to the image data of each page in the processing path in accordance with the process order of the processing processed on the image processing unit 12. With displaying the icon images, the user's operation may be detected. In such a case, the image processing device 1 is allowed to change the process order of the processing to process the image data of each page on the image processing unit 12 in accordance with the user's operation. Thus, the user is allowed to shuffle the page order of the image data containing data of multiple pages during execution of the job, and is not required to make the operation to shuffle the pages after execution of the job, resulting in improvement in operation efficiency.

When the user's operation is to turn the icon image displayed in the processing path back over the processing path, the image processing device 1 of the present preferred embodiment causes the image processing unit 12 to read again the original image data in the image memory 11 and to carry out the image processing until the processing corresponding to the position at which the icon image is displayed. The user may notice the mistake on the processing to process the image data that has already been performed. Even in this case, the user makes the intuitive operation to drag the icon image displayed in the processing path back over the processing path, thereby giving the instruction to redo the image processing to the image processing device 1.

The image processing device 1 of the present preferred embodiment displays the image processing information performed in each processing process set in advance on the image processing unit 12 in the processing path displayed on the viewing area of the display unit 24. By viewing the image processing information displayed on the viewing area of the display unit 24, the user is allowed to know the detail of the image processing that is carried out during execution of the job. As a result, this may prevent the user from noticing the mistake on the settings of the image processing only after completion of execution of the job.

The user makes the operation to tap the icon image. In this case, the image processing device 1 of the present preferred embodiment temporarily suspends the image processing of every processing process performed on the image processing unit 12. When the user notices the mistake on the settings of the image processing at the time he or she checked the processing path displayed on the viewing area of the display unit 24, he or she makes the intuitive operation to tap the icon image moved over the processing path. As a result, the user is allowed to temporarily suspend the image processing of every processing process performed on the image processing unit 12.

The user's operation may be the operation relating to the processing path. In this case, the image processing device 1 of the present preferred embodiment temporarily suspends the image processing of the processing process after the position at which the user's operation is made of the processing path of each processing process performed on the image processing unit 12. The user may notice the mistake on the settings of the image processing which has not been carried out yet. In this case, the user makes the intuitive operation to operate the processing path before the image processing the settings of which are configured wrongly. As a result, the image processing the settings of which are configured wrongly is prevented from being performed. Also, it is unnecessary to make further operation, etc. to carry out the processing from the start to the processing before the image processing the settings of which are configured wrongly.

The processing performed on the image processing unit 12 or the image outputting unit 13 is temporarily suspended in response to the user's operation. With the temporal suspension, the image processing device 1 of the present preferred embodiment displays the list of the image processing executable on the image processing unit 12 or the list of the way to output available on the image outputting unit 13 on the viewing area of the display unit 24. The user is allowed to delete unnecessary image processing or the way to output from the list displayed after he or she made operation to temporarily suspend execution of the job, or to add necessary image processing or the way to output to the list. The user is allowed to delete or add soon after the operation to temporarily suspend execution of the job as the series of the operations, resulting in improvement in operability.

As the icon image displayed in the processing path moves along the processing path, the image processing device 1 of the present preferred embodiment displays the list of the changeable image processing of each processing process performed on the image processing unit 12 or the list of the way to output available on the image outputting unit 13 on the viewing area of the display unit 24. The user is allowed to delete unnecessary image processing or the way to output from the list, or to add necessary image processing or the way to output to the list, resulting in enhanced operability.

The user may make the operation to connect the path line of the icon image to more than one way to output available on the image outputting unit 13. In such a case, the image processing device 1 of the present preferred embodiment causes the image outputting unit 13 to output the image by the selected more than one way. The user makes the intuitive operation to connect the path line of the icon image to more than one way to output, thereby causing the image processing device 1 to produce the image output in the several ways with one execution of the job.

The image processing device 1 of the present preferred embodiment includes the user interface that allows the user to make the intuitive operation to change the process detail or the process order of the image data during execution of the job. This user interface provides a great operability especially when the user makes change in the process detail or the process order of the image data during execution of the job.

As described above, the series of the operations performed during execution of the job on the image processing device 1 may be checked by the user during execution of the job. The image processing device 1 is allowed to make change in the process detail or the process order of the image data included in the series of the operations in response to user's operation even in the middle of execution of the job.

(Modifications)

While the preferred embodiment of the present invention has been described above, the present invention is not limited to the preferred embodiment. Various modifications may be applied to the present invention.

It is assumed, for example, that the image processing unit 12 formed from the software perform each processing. In such a case, the time required for the processing may differ depending on the process burden on the software. If the software performs a large number of complicated computation processing, it sometimes require a long time such as few seconds to complete the processing to process the image data. In such a case, the icon image displayed on the viewing area of the display unit 24 of the operational panel 5 may be moved to the next process block over the processing path after the processing on each software is complete. It is assumed, for example, that the user makes the operation to change the settings of the processing which has already been started in the middle of execution of the job. In such a case, if the icon image displayed on the viewing area of the display unit 24 moves to the next process block after the processing on each software is complete, the processing on the software is required to be performed again by taking a long time such as few seconds after making change in the settings in response to user's operation. This results in extremely poor process efficiency. In order to avoid the poor process efficiency, the icon image is preferably moved to the process block ahead of the process block corresponding to the processing actually performed on the software before the processing is performed on the software. As a result, even when the user makes the operation to change the settings of the processing which is seemed to be started, for instance, the processing is not actually started on the software. So, the settings may be changed before actually starting the processing on the software. Thus, a less frequency of preforming the processing requiring a long time to be performed may be achieved, and the poor process efficiency may be avoided.

The user may drag the icon image to turn it back in the processing path during execution of the job. In such a case, according to the present preferred embodiment as described above, if the icon image placed ahead another icon image is moved to the position behind another icon image, the process order of the image data is successfully shuffled. This is not only the operation to shuffle the process order. When the user drags the icon image over the processing path, for example, another icon image may also be moved with the dragged icon image without shuffling the process order.

Each of the detailed configurations of the image inputting unit 10, the image processing unit 12, the image outputting unit 13 and the post-processing device 1b is one of the examples. The configuration not described above may also be included in each of the image inputting unit 10, the image processing unit 12, the image outputting unit 13 and the post-processing device 1b.

What is claimed is:

1. An image processing device, comprising:
a display device on which a variety of information is displayed;
a manipulation detecting part for detecting an operation on said display device;
an image inputting part for inputting image data;
a storage device for storing the image data input by said image inputting part;
an image processing part for reading the image data stored in said storage device and performing image processing in accordance with a processing process set in advance;
an image outputting part for outputting an image in a predetermined way to output based on the image data which is processed by said image processing part; and
a processor configured to:
display a processing path resembling a sequential order of different processing steps to be performed on the image data, each of the different processing steps being displayed in order along the processing path and including displayed information specifying a detail of the processing of each step, the processing path being from the processing after the image data is input by said image inputting part to the processing until the image is output by said image outputting part on said display device;
move an icon image corresponding to the image data along said processing path and past each processing step as each processing step along the path is completed, so that movement of the icon image along the processing path coincides with a completion of the one of the processing steps;
temporarily suspend the processing performed by said image processing part or said image outputting part when said manipulation detecting part detects the operation on said display device with the icon image corresponding to the image data being displayed in said processing path; and
make change in the image processing performed by said image processing part or the way for said image outputting part to output the image based on the operation detected on said display device by said manipulation detecting part.

2. The image processing device according to claim 1, wherein
said image processing part reads the image data of a single page in said storage device sequentially and carries out the image processing to process the image data of multiple pages in parallel in accordance with said processing process,
said processor is configured to display the multiple icon images each of which corresponding to the image data of the single page in said processing path in accordance with a process order of the processing performed by said image processing part as the image processing to process the image data of the multiple pages is carried out in parallel by said image processing part, and
said processor is configured to make change in the process order of the processing performed by said image processing part to process the image data of each page based on the operation detected by said manipulation detecting part.

3. The image processing device according to claim 1, wherein
said processor, when the operation detected by said manipulation detecting part is the drag operation to turn the icon image displayed in said processing path back over said processing path, is configured to cause said image processing part to read again the image data stored in said storage device and to perform the image processing of said processing process until the processing before a position to which the icon image is dragged.

4. The image processing device according to claim 1, wherein
said processor, when the operation detected by said manipulation detecting part is to tap the icon image, is configured to temporarily suspend the image processing of every processing process performed by said image processing part.

5. The image processing device according to claim 1, wherein
said processor, when the operation detected by said manipulation detecting part is to operate said processing path, is configured to temporarily suspend the image processing corresponding to the processing process after the operated processing path of each processing process performed by said image processing part.

6. The image processing device according to claim 1, wherein
said processor is configured to display a list of the image processing executable on said image processing part or a list of the way to output available on said image outputting part on said display device as said processor temporarily suspends the processing performed by said image processing part or by said image outputting part.

7. The image processing device according to claim 1, wherein
said processor is configured to display a list of the changeable image processing of each processing process performed by said image processing part or the list of the way to output available on said image outputting part on said display device as the icon image displayed in said processing path moves along said processing path.

8. The image processing device according to claim 6, wherein
said processor is configured to cause said image outputting part to output the image in the several ways to output when the operation detected by said manipulation detecting part is to connect the path line of the icon image to the several ways to output available on said image outputting part.

9. A display device capable of displaying in cooperation with an image processing device capable of performing a variety of image processing to process image data, wherein
said image processing device includes:
an image inputting part for inputting the image data;
a storage device for storing the image data input by said image inputting part;
an image processing part for reading the image data stored in said storage device and performing the image processing in accordance with a processing process set in advance;
an image outputting part for outputting an image in a predetermined way to output based on the image data which is processed by said image processing part; and
a job controlling part for controlling the image processing performed by said image processing part or the processing to output the image performed by said image outputting part,
said display device includes:
a communication part for establishing communication with said job controlling part of said image processing device;
a display device on which a variety of information is displayed;
a manipulation detecting part for detecting an operation on said display device; and
a processor configured to:
display a processing path resembling a sequential order of different processing steps to be performed on the image data, each of the different processing steps being displayed in order along the processing path and including displayed information specifying a detail of the processing of each step, the processing path being from the processing after the image data is input by said image inputting part to the processing until the image is output by said image outputting part on said display device;
move an icon image corresponding to the image data along said processing path and past each processing step as each processing step along the path is completed, so that movement of the icon image along the processing path coincides with a completion of the one of the processing steps;
send a stop signal to temporarily suspend the processing performed by said image processing part or said image outputting part to said job controlling part via said communication part;
send instruction information to make change in the image processing performed by said image processing part or a way for said image outputting part to output the image based on the operation detected on said display device by said manipulation detecting part to said job controlling part when said manipulation detecting part detects the operation on said display device with the icon image moved along said processing path being displayed.

10. The display device according to claim 9, wherein
said processor is configured to display the multiple icon images each of which corresponding to the image data of a single page in said processing path in accordance with a process order of the processing performed by said image processing part as the image processing to process the image data of the multiple pages is carried out in parallel by said image processing part, and
said processor, in response to detecting the operation on said display device, is configured to send information to make change in the process order of the processing performed by said image processing part to process the image data of each page based on the operation as said instruction information to said job controlling part.

11. The display device according to claim 9, wherein
said processor, when the operation made on said display device is to tap the icon image, is configured to send a signal to temporarily suspend the image processing of every processing process performed by said image processing part as said stop signal to said job controlling part.

12. The display device according to claim 9, wherein
said processor, when the operation made on said display device is to operate said processing path, is configured to send a signal to temporarily suspend the image processing corresponding to the processing process after the operated processing path of each processing process performed by said image processing part as said stop signal to said job controlling part.

13. The display device according to claim 9, wherein
said processor is configured to display a list of the image processing executable on said image processing part or a list of the way to output available on said image outputting part on said display device as said stop signal is sent.

14. The display device according to claim 9, wherein
said processor is configured to display displays a list of the changeable image processing of each processing process performed by said image processing part or the list of the way to output available on said image outputting part on said display device as the icon image displayed in said processing path moves along said processing path.

15. The display device according to claim 13, wherein said processor, when the operation made on said display device is to connect the path line of the icon image to the several ways to output available on said image outputting part, is configured to send information to give an instruction to output the image in the several ways to output to said image outputting part as said instruction information to said job controlling part.

16. A non-transitory computer readable recording medium on which a program is recorded, said program executable on a display device including a display device on which a variety of information is displayed and capable of detecting an operation on said display device, said program being executed on said display device, thereby causing said display device to display in cooperation with an image processing device capable of performing a variety of image processing to process image data, wherein said image processing device includes:
an image inputting part for inputting the image data;
a storage device for storing the image data input by said image inputting part;
an image processing part for reading the image data stored in said storage device and performing the image processing in accordance with a processing process set in advance;
an image outputting part for outputting an image in a predetermined way to output based on the image data which is processed by said image processing part; and
a job controlling part for controlling the image processing performed by said image processing part or the processing to output the image performed by said image outputting part, said program executed on said display device to function as a system comprises:
a communication part for establishing communication with said job controlling part of said image processing device;
a manipulation detecting part for detecting an operation on said display device; and
a processor configured to:
display a processing path resembling a sequential order of different processing steps to be performed on the image data, each of the different processing steps being displayed in order along the processing path and including displayed information specifying a detail of the processing of each step, the processing path being from the processing after the image data is input by said image inputting part to the processing until the image is output by said image outputting part on said display device;
move an icon image corresponding to the image data along said processing path and past each processing step as each processing step along the path is completed, so that movement of the icon image along the processing path coincides with a completion of the one of the processing steps;
send a stop signal to temporarily suspend the processing performed by said image processing part or said image outputting part to said job controlling part via said communication part;
send instruction information to make change in the image processing performed by said image processing part or a way for said image outputting part to output the image based on the operation detected on said display device by said manipulation detecting part to said job controlling part when said manipulation detecting part detects the operation on said display device with the icon image moved along said processing path being displayed.

17. A method for displaying a variety of image processing to process image data on a display device of an image processing device, comprising:
inputting the image data;
storing the image data that is inputted;
reading, via an image processing part, the image data that is stored and performing image processing in accordance with a processing process set in advance;
outputting, via an image outputting part, an image in a predetermined way based on the image processing;
controlling, with a job controller, the image processing performed by said image processing part or the outputting performed by said image outputting part;
detecting an operation on the display device;
displaying on said display device a processing path resembling a sequential order of different processing steps to be performed on the image data, each of the different processing steps being displayed in order along the processing path and including displayed information specifying a detail of the processing of each step, the processing path being from the processing after the image data is input to the processing until the image is output by said image outputting part;
moving an icon image corresponding to the image data along said processing path and past each processing step as each processing step along the path is completed, so that movement of the icon image along the processing path coincides with a completion of the one of the processing steps;
sending a stop signal to temporarily suspend the image processing performed by said image processing part or said outputting performed by said image outputting part; and
sending instruction information to make change in the image processing performed by said image processing part or a way for said image outputting part to output the image based on the operation detected on said display device to said job controller when the operation on said display device is detected with the icon image moved along said processing path being displayed.

* * * * *